(12) United States Patent
Tang et al.

(10) Patent No.: US 12,328,643 B2
(45) Date of Patent: Jun. 10, 2025

(54) DEVICE TRACKING DETECTION METHOD AND ELECTRONIC DEVICE

(71) Applicant: HONOR DEVICE CO., LTD., Guangdong (CN)

(72) Inventors: Nengfu Tang, Shenzhen (CN); Weilin Gong, Shenzhen (CN); Bin Yan, Shenzhen (CN); Li Shen, Shenzhen (CN); Yashu Zhang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 2 days.

(21) Appl. No.: 17/925,402

(22) PCT Filed: May 7, 2022

(86) PCT No.: PCT/CN2022/091339
§ 371 (c)(1),
(2) Date: Nov. 15, 2022

(87) PCT Pub. No.: WO2022/257666
PCT Pub. Date: Dec. 15, 2022

(65) Prior Publication Data
US 2024/0098452 A1    Mar. 21, 2024

(30) Foreign Application Priority Data

Jun. 9, 2021  (CN) .......................... 202110644509.X
Dec. 30, 2021 (CN) .......................... 202111667887.6

(51) Int. Cl.
*H04W 4/029* (2018.01)
*H04W 4/02* (2018.01)
(Continued)

(52) U.S. Cl.
CPC ........... *H04W 4/029* (2018.02); *H04W 4/027* (2013.01); *H04W 4/12* (2013.01); *H04W 4/80* (2018.02)

(58) Field of Classification Search
CPC ....... H04W 4/029; H04W 4/80; H04W 4/027; H04W 4/12
See application file for complete search history.

(56) References Cited

U.S. PATENT DOCUMENTS 10,640,084 B1    5/2020   Conners
2016/0020861 A1*  1/2016   Jin ........................ H04W 4/023
                                                    455/456.1
(Continued)

FOREIGN PATENT DOCUMENTS

CN        103997712 A       8/2014
CN        106504484 A       3/2017
(Continued)

*Primary Examiner* — Curtis B Odom

(57) ABSTRACT

This application provides a device tracking detection method and an electronic device, and is related to the field of terminal technologies. Because when the first electronic device receives a first Bluetooth signal based on a first signal filter, it implies that a first Bluetooth peripheral is near the first electronic device; and because the first Bluetooth peripheral broadcasts the first Bluetooth signal only once every other second duration, it also implies that the first Bluetooth peripheral may be near the first electronic device within the second duration during which the first Bluetooth signal is received based on the first signal filter. Therefore, when a moving speed is greater than a preset speed threshold, recorded trajectory information of the first Bluetooth peripheral includes not only location information of the first electronic device when receiving the first Bluetooth signal, but also location information of the first electronic device within the second duration.

20 Claims, 16 Drawing Sheets

(51) Int. Cl.
*H04W 4/12* (2009.01)
*H04W 4/80* (2018.01)

(56) References Cited

U.S. PATENT DOCUMENTS

| | | |
|---|---|---|
| 2018/0184286 A1 | 6/2018 | Patterson |
| 2019/0045332 A1 | 2/2019 | Ye |
| 2019/0147311 A1 | 5/2019 | Purba |
| 2020/0034928 A1 | 1/2020 | Lim et al. |
| 2020/0226363 A1 | 7/2020 | Holliday et al. |

FOREIGN PATENT DOCUMENTS

| | | |
|---|---|---|
| CN | 108513250 A | 9/2018 |
| CN | 108646736 A | 10/2018 |
| CN | 109561417 A | 4/2019 |
| CN | 111148215 A | 5/2020 |
| CN | 112672286 A | 4/2021 |
| WO | 2020144367 A1 | 7/2020 |

\* cited by examiner

DEVICE TRACKING DETECTION METHOD AND ELECTRONIC DEVICE

CROSS-REFERENCE TO RELATED APPLICATIONS

This application is a national stage of International Application No. PCT/CN2022/091339, filed on May 7, 2022, which claims priority to Chinese Patent Application No. 202110644509.X, filed on Jun. 9, 2021, and claims priority to Chinese Patent Application No. 202111667887.6, filed on Dec. 30, 2021. The disclosures of all the aforementioned applications are hereby incorporated by reference in their entireties.

TECHNICAL FIELD

This application relates to the field of terminal technologies, and in particular, to a device tracking detection method and an electronic device.

BACKGROUND

With the development of Bluetooth technologies, some Bluetooth peripherals can be used to position an item. For example, a user may place a first Bluetooth peripheral with items (for example, keys and a backpack) that are carried with the user. The user can obtain location information of the first Bluetooth peripheral (that is, location information of an item) to position the item.

In some cases, a user B may place the first Bluetooth peripheral in items carried with a user A. As the user B can obtain location information of the first Bluetooth peripheral, the user B can track the user A based on the first Bluetooth peripheral.

In this way, in order to avoid being tracked by the first Bluetooth peripheral, the user A can use an electronic device to detect the first Bluetooth peripheral in the items carried with the user A. However, when the first Bluetooth peripheral and the electronic device are in a state of high-speed moving, accuracy of detecting the first Bluetooth peripheral in the carried items by the electronic device is low.

SUMMARY

This application provides a device tracking detection method and an electronic device, where when a first Bluetooth peripheral and a first electronic device are in a state of high-speed moving, the first electronic device can accurately detect the first Bluetooth peripheral in items.

According to a first aspect, this application provides a device tracking detection method, applied to a first electronic device, where the first electronic device includes a target module, and the target module is configured to cache location information of a location at which the first electronic device is located. The method provided in this application includes: obtaining, by the first electronic device, location information from the target module and recording the obtained location information as location information of the first electronic device, where a set of the location information of the first electronic device is first trajectory information; obtaining, by the first electronic device, location information from the target module when a first Bluetooth signal is received based on a first signal filter; recording, by the first electronic device, the location information obtained at a time when the first Bluetooth signal is received, as location information of a first Bluetooth peripheral, where a set of the location information of the first Bluetooth peripheral is second trajectory information; determining, by the first electronic device, whether it is in a target state, where the target state is a state in which a moving speed is greater than a preset speed threshold; obtaining, by the first electronic device when in the target state, location information within a second duration from the first trajectory information, where the second duration is terminated at a time when the first electronic device receives the first Bluetooth signal, and the second duration is a period duration during which the first Bluetooth peripheral broadcasts the first Bluetooth signal; inserting, by the first electronic device, the location information obtained within the second duration into the second trajectory information to update the second trajectory information; and alerting, by the first electronic device when similarity between the first trajectory information and the updated second trajectory information is greater than a preset similarity threshold, a user of being tracked by the first Bluetooth peripheral.

In the device tracking detection method provided in this application, because when the first electronic device receives the first Bluetooth signal based on the first signal filter, it implies that the first Bluetooth peripheral is near the first electronic device; and because the first Bluetooth peripheral broadcasts the first Bluetooth signal only once every other second duration, it also implies that the first Bluetooth peripheral may be near the first electronic device within the second duration during which the first Bluetooth signal is received based on the first signal filter.

Therefore, when the moving speed is greater than the preset speed threshold, recorded trajectory information of the first Bluetooth peripheral includes not only the location information of the first electronic device when receiving the first Bluetooth signal, but also the location information of the first electronic device within the second duration before the first Bluetooth signal is received, so that content of the obtained trajectory information of the first Bluetooth peripheral is more abundant with higher reliability. In this way, based on the first trajectory information (that is, trajectory information of the first electronic device) and the second trajectory (the trajectory information of the first Bluetooth peripheral), an alert of being tracked is more reliable.

In an optional implementation, the obtaining, by the first electronic device, location information from the target module and recording the obtained location information as location information of the first electronic device includes: obtaining, by the first electronic device, location information from the target module; and inserting, by the first electronic device, the location information obtained from the target module into a created first data table, where in the first data table, there is a correspondence between a physical address of the first electronic device and the location information.

In this way, the first data table can be used to record the location information of the first electronic device, which is convenient and quick.

In an optional implementation, the recording, by the first electronic device, the location information obtained at a time when the first Bluetooth signal is received, as location information of a first Bluetooth peripheral includes: inserting, by the first electronic device, the location information obtained from the target module at the time when the first Bluetooth signal is received into a created second data table, where in the second data table, there is a correspondence between a physical address of the first Bluetooth peripheral and the location information.

In this way, the second data table can be used to record the location information of the first Bluetooth peripheral, which is convenient and quick.

In an optional implementation, the obtaining, by the first electronic device when in the target state, location information within a second duration from the first trajectory information includes: determining, by the first electronic device when in the target state, whether the location information is recorded within the second duration in the first trajectory information; and when the location information is recorded, obtaining, by the first electronic device, location information within the second duration from the first trajectory information.

In an optional implementation, before the obtaining, by the first electronic device, location information from the target module and recording the obtained location information as location information of the first electronic device, the method provided in this application further includes: enabling, by the first electronic device, a preset mode.

It can be understood that the first electronic device receives the first Bluetooth signal only in the preset mode, which can save power consumption and better meet user needs.

Further, the enabling, by the first electronic device, a preset mode includes: displaying, by the first electronic device, a first screen, where the first screen includes a first control; and enabling, by the first electronic device, the preset mode in response to a trigger operation by the user on the first control.

In this way, the user can enable the preset mode by triggering the first control in the first screen, which is convenient and quick.

Further, the first screen is a system desktop, and the displaying, by the first electronic device, a first screen includes: displaying, by the first electronic device, the system desktop in response to the trigger operation by the user, where the system desktop includes a first prompt box, and the first prompt box includes the first control; and enabling, by the first electronic device, the preset mode in response to an enabling operation by the user on the first control.

In this way, the user can enable the preset mode simply from the system desktop, which is convenient and quick.

Alternatively, further, the displaying, by the first electronic device, a first screen includes: displaying, by the first electronic device, a system desktop, where the system desktop includes a "settings" icon; displaying, by the first electronic device, the first screen in response to a trigger operation by the user on the "settings" icon, where the first screen includes the first control; and enabling, by the first electronic device, the preset mode in response to an enabling operation by the user on the first control.

In this way, the user can enable the preset mode at any time after triggering the "settings" icon, which is convenient and quick.

In a possible implementation, the alerting, by the first electronic device, a user of being tracked by the first Bluetooth peripheral includes: popping up, by the first electronic device, a first notification in a navigation bar of a second screen that is being displayed; and displaying, by the first electronic device, alert information in response to a pull-down operation by the user on the navigation bar.

In this way, the user only needs to perform a pull-down operation on the navigation bar to perceive the alert information, which is convenient and quick.

Further, the alert information includes a second control, and after the displaying alert information, the method provided in this application further includes:
establishing, by the first electronic device, a Bluetooth connection with the first Bluetooth peripheral based on a physical address carried in the first Bluetooth signal in response to a trigger operation by the user on the second control; and controlling, by the first electronic device, the first Bluetooth peripheral to perform a function of alerting.

In this way, after the first Bluetooth peripheral perform the function of alerting, the user can determine a location of the first Bluetooth peripheral more conveniently.

In a possible implementation, the alerting, by the first electronic device, a user of being tracked by the first Bluetooth peripheral includes: controlling, by the first electronic device, a motor of the first electronic device to vibrate; or controlling, by the first electronic device, a speaker of the first electronic device to output an alert tone; or controlling, by the first electronic device, a light indicator of the first electronic device to blink; or sending, by the first electronic device, a control command to a wearable device with which a communication connection has been established, to control the wearable device to vibrate or output an alert tone.

In a possible implementation, before the alerting, by the first electronic device when similarity between the first trajectory information and the updated second trajectory information is greater than a preset similarity threshold, a user of being tracked by the first Bluetooth peripheral, the method provided in this application further includes: comparing, by the first electronic device, the first trajectory information and the updated second trajectory information to find the similarity.

Further, the location information is base station identifier (s), and the comparing the first trajectory information and the updated second trajectory information to find the similarity includes: comparing, by the first electronic device based on an equation $$S = \frac{N1}{N2},$$

the first trajectory information and the updated second trajectory information, where N1 is a quantity of base station identifiers in the updated second trajectory information, N2 is a quantity of base station identifiers in the first trajectory information, and S is the similarity.

Alternatively, further, the location information is GPS positioning information, and the comparing the first trajectory information and the updated second trajectory information to find the similarity includes: calculating, by the first electronic device based on an equation $$S = \frac{S1}{S2},$$

the similarity between the first trajectory information and the updated second trajectory information, where S1 is a moving distance indicated by the GPS positioning information in the second trajectory information, S2 is a moving distance indicated by the GPS positioning information in the first trajectory information, and S is the similarity.

In an optional implementation, the determining, by the first electronic device, whether it is in a target state includes: obtaining, by the first electronic device, target information, where the target information is information characterizing the moving speed of the first electronic device; and detecting, by the first electronic device based on the target information, whether the first electronic device is in the target state.

Further, the target state is a moving state in which the moving speed of the first electronic device is greater than a first speed threshold, and that the first electronic device determines that the first electronic device is in the target state includes: when the target information is location information, identifying, by the first electronic device, whether the location information obtained from the target module carries a field indicating that a base station is located along a high-speed railway, and if yes, determining, by the first electronic device, that the first electronic device is in the target state; or when the target information is moving speed, determining, by the first electronic device, whether a moving speed is greater than a preset first speed threshold, and if yes, determining, by the first electronic device, that the first electronic device is in the target state, or when the target information is itinerary information recorded in an application program, detecting, by the first electronic device, whether a target period in the itinerary information is reached, and if yes, determining, by the first electronic device, that the first electronic device is in the target state, where the itinerary information is used to indicate that the user is in the target state during the target period.

In a possible implementation, before the obtaining, by the first electronic device, location information from the target module and recording the obtained location information as location information of the first electronic device, the method provided in this application further includes: receiving, by the first electronic device based on a second signal filter, a second Bluetooth signal broadcast by a second electronic device.

It can be understood that only when the first electronic device can receive, based on a second signal filter, a second Bluetooth signal broadcast by a second electronic device nearby, a location of the user may be leaked to others. In this way, subsequent device tracking detection steps may be performed only when the second Bluetooth signal broadcast by the second electronic device is received, which can save power consumption of the first electronic device.

According to a second aspect, this application provides a device tracking detection apparatus, applied to a first electronic device, where the first electronic device includes a target module, and the target module is configured to cache location information of a location at which the first electronic device is located. The apparatus provided in this application includes: a processing unit, configured to obtain location information from the target module and record the obtained location information as location information of the first electronic device, where a set of the location information of the first electronic device is first trajectory information. The processing unit is further configured to obtain location information from the target module when a first Bluetooth signal is received based on a first signal filter. The processing unit is further configured to record the location information obtained at a time when the first Bluetooth signal is received, as location information of a first Bluetooth peripheral, where a set of the location information of the first Bluetooth peripheral is second trajectory information. The processing unit is further configured to determine whether the first electronic device is in a target state, where the target state is a state in which a moving speed is greater than a preset speed threshold. When the first electronic device is in the target state, the processing unit is further configured to obtain location information within a second duration from the first trajectory information, where the second duration is terminated at a time when the first electronic device receives the first Bluetooth signal, and the second duration is a period duration during which the first Bluetooth peripheral broadcasts the first Bluetooth signal. The processing unit is further configured to insert the location information obtained within the second duration into the second trajectory information to update the second trajectory information. The processing unit is further configured to alert, when similarity between the first trajectory information and the updated second trajectory information is greater than a preset similarity threshold, a user of being tracked by the first Bluetooth peripheral.

According to a third aspect, this application provides a device tracking detection apparatus, including a processor and a memory, where the memory is configured to store a code instruction, and the processor is configured to run the code instruction, so that the electronic device is caused to perform the device tracking detection method described in any one of the first aspect or the implementations of the first aspect.

According to a fourth aspect, this application provides a computer-readable storage medium. The computer-readable storage medium stores an instruction. When the instruction is executed, a computer is caused to perform the device tracking detection method described in any one of the first aspect or the implementations of the first aspect.

According to a fifth aspect, this application provides a computer program product, including a computer program. When the computer program is run, a computer is caused to perform the device tracking detection method described in any one of the first aspect or the implementations of the first aspect.

It should be understood that the second aspect to the fifth aspect of this application correspond to the technical solutions of the first aspect of this application, and the beneficial effects obtained by each aspect and corresponding feasible implementations are similar and will not be repeated herein again.

DETAILED DESCRIPTION

To clearly describe technical solutions in embodiments of this application, terms such as "first" and "second" are used in the embodiments of this application to distinguish between same items or similar items that have basically the same functions or purposes. For example, a first value and a second value are merely intended to distinguish between different values, but not to limit a sequential order thereof. A person skilled in the art may understand that the terms such as "first" and "second" do not limit a quantity and an execution sequence, and the terms such as "first" and "second" do not indicate a definite difference.

It should be noted that, in this application, terms such as "an example" or "for example" are used to indicate an example, an illustration, or an explanation. Any embodiment or design solution described by using "an example" or "for example" in this application should not be construed as being more preferred or advantageous than other embodiments or design solutions. To be precise, the terms such as "an example" or "for example" are intended to present a related concept in a specific manner.

In this application, "at least one" means one or more, and "a plurality of" means two or more. The term "and/or" describes an association relationship between associated objects and indicates that three relationships may exist. For example, A and/or B may represent the following cases: only A, both A and B, and only B, where A and B may be singular or plural. The character "/" generally indicates an "or" relationship between associated objects before and after the character. "At least one of the following items (objects)" or a similar expression means any combination of these items, including a single item (object) or any combination of a plurality of items (objects). For example, at least one of a, b, or c may indicate: a, b, c, a and b, a and c, b and c, or a, b, and c, where a, b, and c may be singular or plural.

With the development of Bluetooth technologies, some Bluetooth peripherals can be used to position an item. For example, a user may place a first Bluetooth peripheral with items (for example, keys and a backpack) that are carried with the user. The user can obtain location information of the first Bluetooth peripheral (that is, location information of an item) to position the item.

Figure 1:
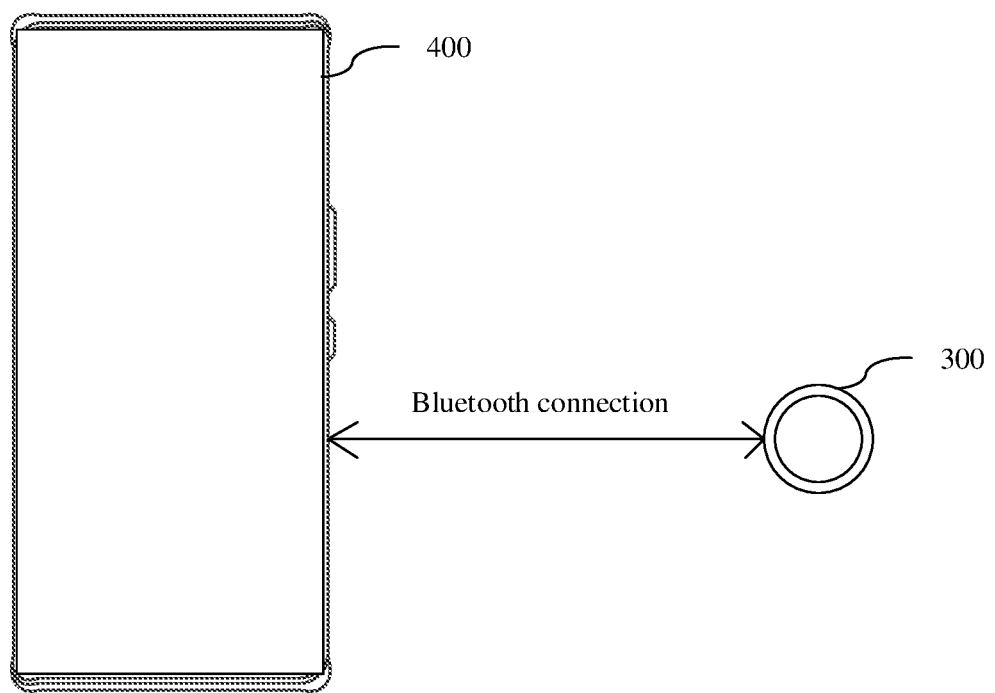
FIG. 1 is a schematic interaction diagram of a Bluetooth connection between a mobile phone 400 with a first Bluetooth peripheral 300.

As shown in FIG. 1, a mobile phone 400 may establish a Bluetooth connection with a first Bluetooth peripheral 300. When a user cannot find an item that he/she carries, the user can find a location of the first Bluetooth peripheral 300 by using the mobile phone 400 to position the item that is placed with the first Bluetooth peripheral 300.

Figure 2:
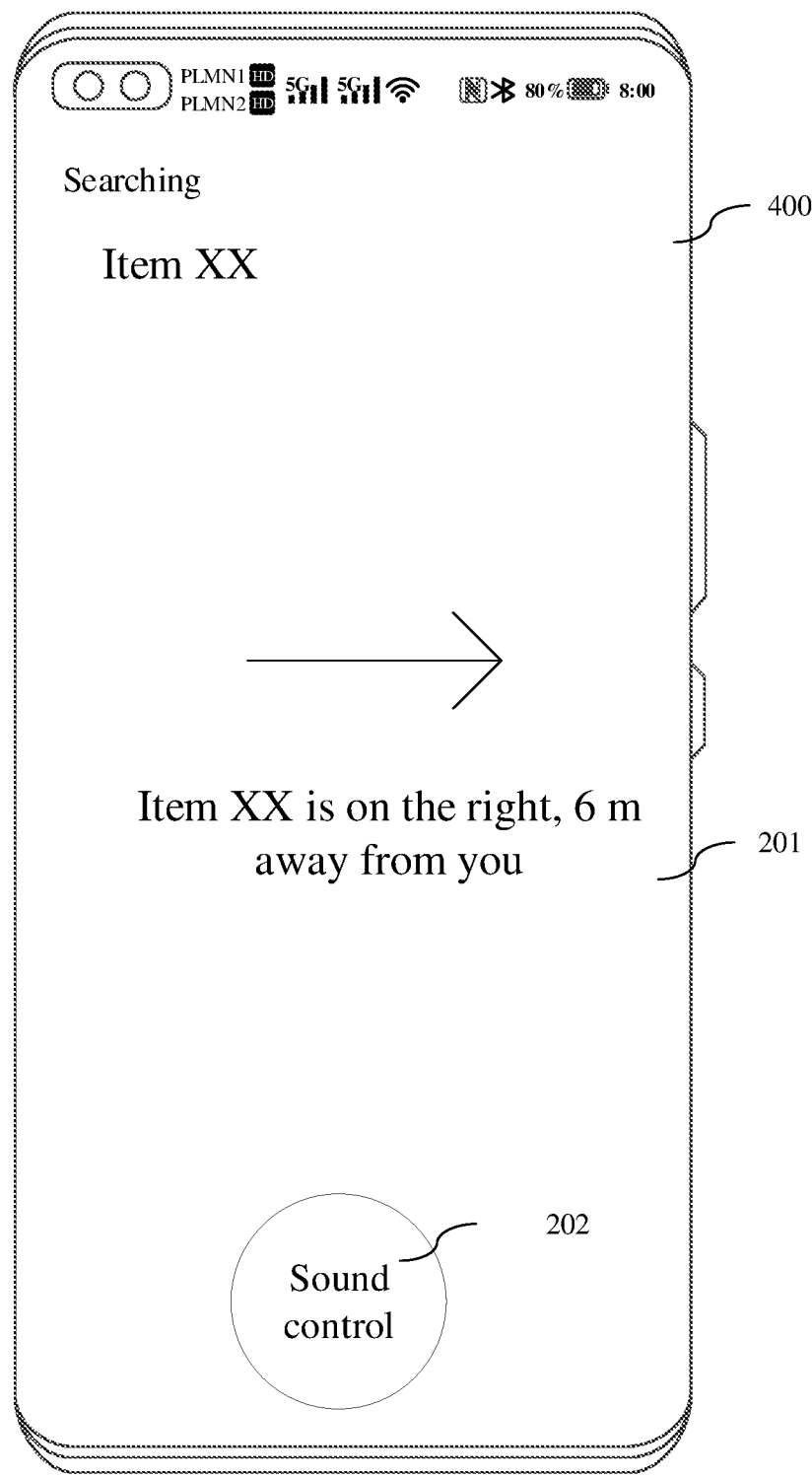
FIG. 2 is a schematic screen diagram of an item positioning screen 201 on the mobile phone 400 displaying location information of the first Bluetooth peripheral 300.

On one hand, still as shown in FIG. 1, when the mobile phone 400 remains connected with the first Bluetooth peripheral 300, the mobile phone 400 can receive a first Bluetooth signal broadcast by the first Bluetooth peripheral 300. Then, after a search function of the mobile phone 400 is triggered by the user, the mobile phone 400 detects for location information of the first Bluetooth peripheral 300 based on the first Bluetooth signal. Then, the mobile phone 400 displays an item positioning screen 201 shown in FIG. 2, with "Item XX is on the right, 6 m away from you" shown in the item positioning screen 201. In other words, the item positioning screen 201 displays the location information of the item. In addition, the item positioning screen 201 further includes a sound control button 202. The mobile phone 400 may also control the first Bluetooth peripheral 300 to sound in response to a trigger operation by the user on the sound control button 202, to assist the user to find an item that is placed with the first Bluetooth peripheral 300.

Figure 3:
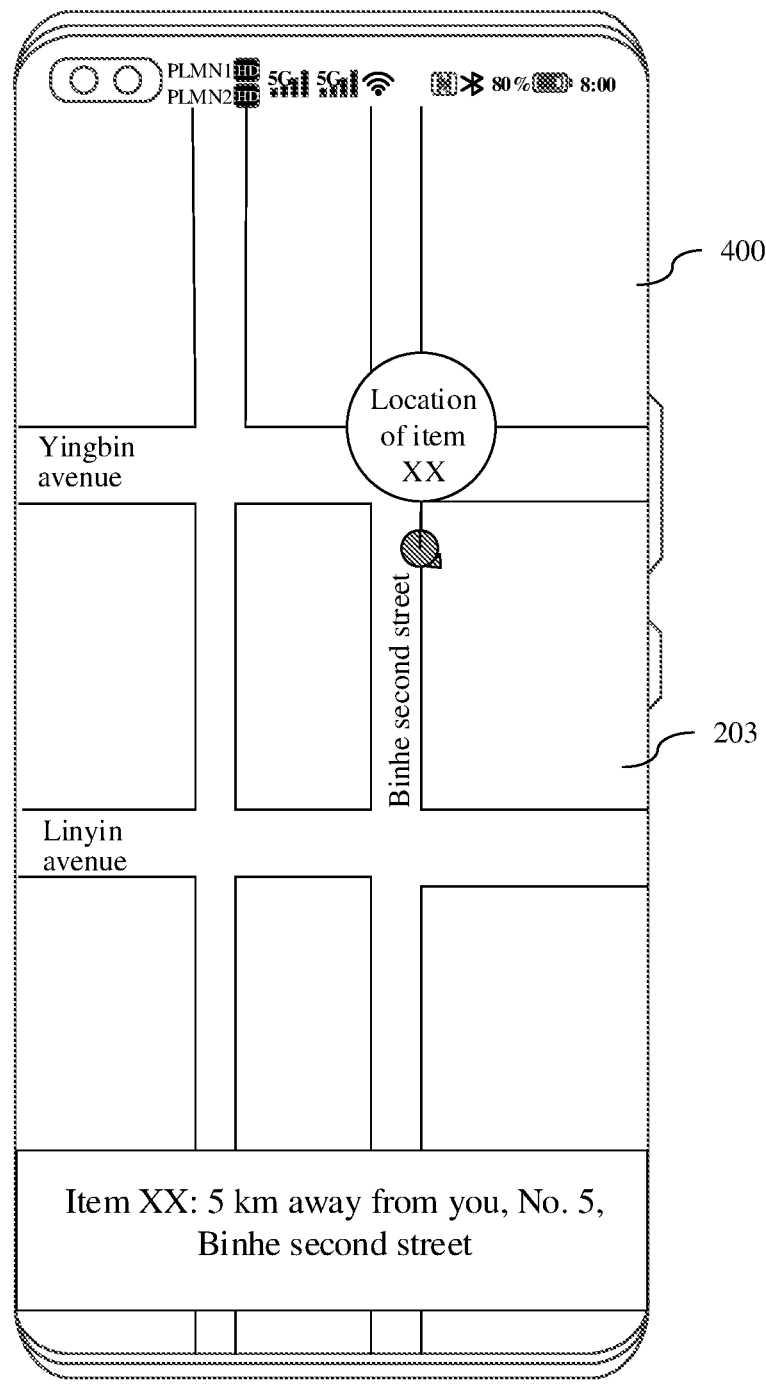
FIG. 3 is a schematic screen diagram of an item positioning screen 203 on the mobile phone 400 displaying location information of an electronic device.

On the other hand, when the mobile phone 400 is disconnected from the first Bluetooth peripheral 300, an electronic device within a preset distance from the first Bluetooth peripheral 300 can receive a first Bluetooth signal broadcast by the first Bluetooth peripheral. Then, the electronic device may send location information of the electronic device to a cloud server. After the search function of the mobile phone 400 is triggered by the user, the mobile phone 400 obtains the location information of the electronic device from the cloud server. Then, the mobile phone 400 displays an item positioning screen 203 shown in FIG. 3. The location information of the electronic device in a map is displayed in the item positioning screen 203. Because the electronic device is within the preset distance from the first Bluetooth peripheral 300, the user can infer a location of the first Bluetooth peripheral 300 by using the location information of the electronic device, to facilitate retrieval of a lost item.

However, there are some security risks associated with application of the first Bluetooth peripheral, that is, a user may use such a first Bluetooth peripheral to track another user. For example, if a user B places his/her first Bluetooth peripheral in a specific item, for example a vehicle or a clothing pocket, of a user A, the user A moves around with the first Bluetooth peripheral without knowledge. As a result, the user B can inquire the cloud server for location information of the electronic device within the preset distance from the first Bluetooth peripheral. Then, the user B can infer location information of the first Bluetooth peripheral from the inquired location information of the electronic device, thereby implementing tracking of the user A. In this way, the first Bluetooth peripheral that tracks the user A needs to be identified.

In view of this, in a device tracking detection method provided in this application, the first electronic device records location information obtained at a time when the first Bluetooth signal is received, as location information of the first Bluetooth peripheral. It can be understood that a set of the location information of the first Bluetooth peripheral is second trajectory information. When the first electronic device is in a target state (that is, a state of high-speed moving), location information within a second duration is obtained from first trajectory information, where the second duration is terminated at a time when the first electronic device receives the first Bluetooth signal, and the second duration is a period duration during which the first Bluetooth peripheral broadcasts the first Bluetooth signal. The first electronic device inserts the location information obtained within the second duration into the second trajectory information to update the second trajectory information.

Therefore, when a moving speed is greater than a preset speed threshold, recorded trajectory information of the first Bluetooth peripheral includes not only the location information of the first electronic device when receiving the first Bluetooth signal, but also the location information of the first electronic device within the second duration before the first Bluetooth signal is received, so that content of the obtained trajectory information of the first Bluetooth peripheral is more abundant with higher reliability. In this way, based on the first trajectory information (that is, trajectory information of the first electronic device) and the second trajectory (the trajectory information of the first Bluetooth peripheral), an alert of being tracked is more reliable.

Figure 4:
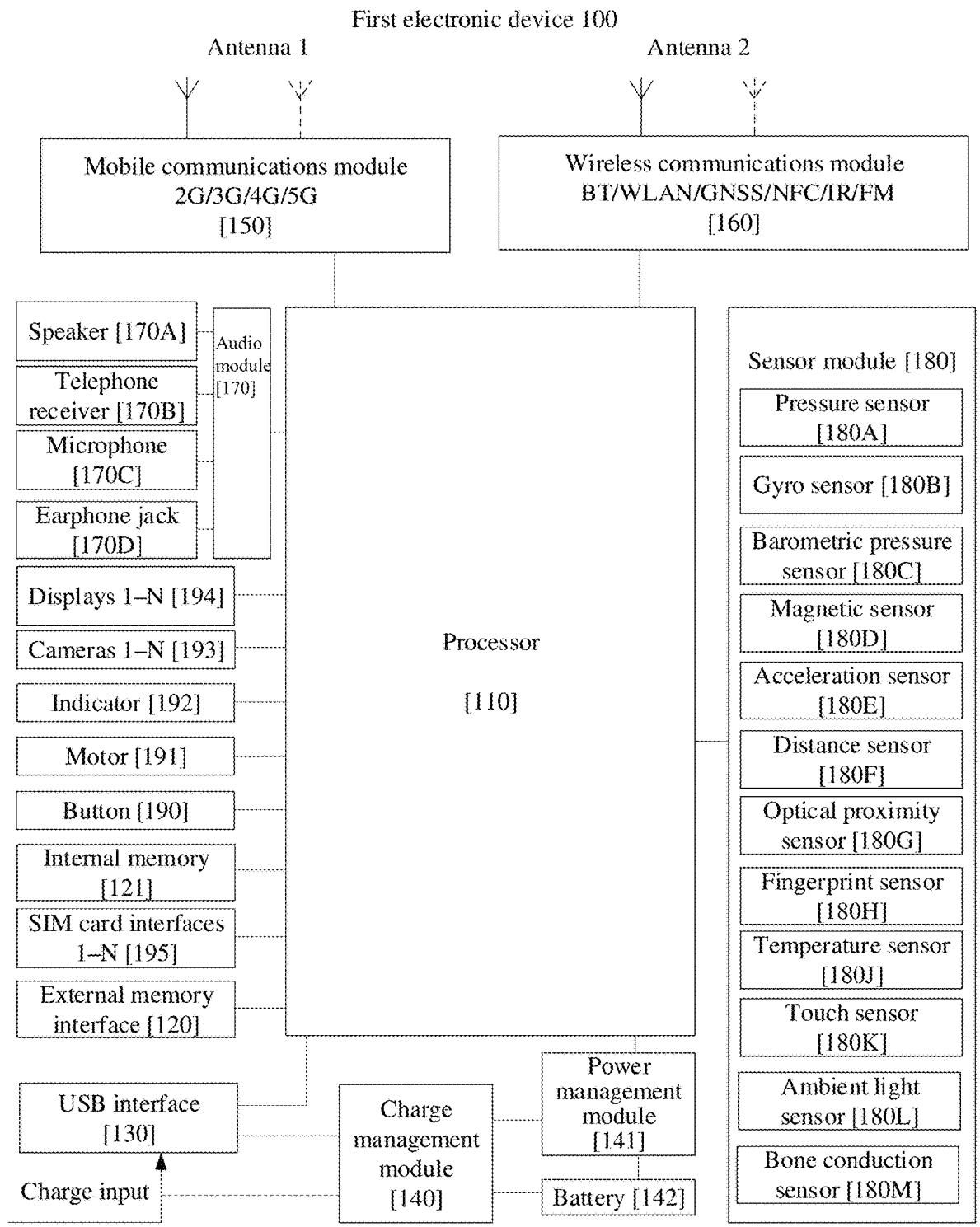
FIG. 4 is a schematic diagram of a hardware structure of a first electronic device 100 according to an embodiment of this application.

The device tracking method provided in this application may be applicable to a first electronic device 100 with a Bluetooth function. FIG. 4 is a schematic structural diagram of the first electronic device 100 with the Bluetooth function. The first electronic device 100 may be a mobile phone, a tablet computer, or the like.

As shown in FIG. 4, the first electronic device 100 may include: a processor 110, an external memory interface 120, an internal memory 121, a universal serial bus (universal serial bus, USB) interface 130, a charge management module 140, a power management module 141, a battery 142, an antenna 1, an antenna 2, a mobile communications module 150, a wireless communications module 160, an audio module 170, a speaker 170A, a telephone receiver 170B, a microphone 170C, an earphone jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be separate devices or may be integrated into one or more processors.

A memory may be further provided in the processor 110 to store instructions and data. In some embodiments, the memory in the processor 110 is a cache memory. The memory may store instructions or data that the processor 110 has just used or used repeatedly. If the processor 110 needs to use the instructions or the data again, the processor 110 may directly call the instructions or the data from the memory, thereby avoiding repeated access, reducing waiting time of the processor 110, and improving system efficiency.

A wireless communication function of the first electronic device 100 may be implemented by using the antenna 1, the antenna 2, the mobile communications module 150, the wireless communications module 160, the modem processor, the baseband processor, and the like.

The antenna 1 and the antenna 2 are configured to transmit and detect an electromagnetic wave signal. Each antenna of the first electronic device 100 may be configured to cover one or more communication bands. Different antennas may each be used for multiple purposes to improve antenna utilization. For example, the antenna 1 may also be used as a diversity antenna of a wireless local area network. In some other embodiments, the antenna may be used in combination with a tuning switch.

The mobile communications module 150 may provide a wireless communication solution including 2G/3G/4G/5G and the like to be applied to the first electronic device 100. The mobile communications module 150 may include at least one filter, a switch, a power amplifier, a low noise amplifier (low noise amplifier, LNA), and the like. The mobile communications module 150 may detect an electromagnetic wave through the antenna 1, perform processing such as filtering and amplification on the detected electromagnetic wave, and transmit the processed electromagnetic wave to the modem processor for demodulation. The mobile communications module 150 may further amplify a signal modulated by the modem processor, and convert the frequency-modulated and amplified signal to an electromagnetic wave for radiation by using the antenna 1. In some embodiments, at least some functional modules of the mobile communications module 150 may be provided in the processor 110. In some embodiments, at least some functional modules of the mobile communications module 150 and at least some modules of the processor 110 may be provided in a same device.

The modem processor may include a modulator and a demodulator. The modulator is configured to modulate a low frequency baseband signal that is to be sent into a medium or high frequency signal. The demodulator is configured to demodulate a detected electromagnetic wave signal into a low frequency baseband signal. Then, the demodulator transmits the low frequency baseband signal obtained through demodulation to the baseband processor for processing. After being processed by the baseband processor, the low frequency baseband signal is transferred to the application processor. The application processor outputs a sound signal through an audio output device (not limited to the speaker 170A, the telephone receiver 170B, and the like), or displays an image or a video through the display 194. In some embodiments, the modem processor may be a separate device. In some other embodiments, the modem processor may be separate from the processor 110 and provided in a same device together with the mobile communications module 150 or another functional module.

The wireless communications module 160 may provide a wireless communication solution to be applied to the first electronic device 100, which includes a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), an infrared (infrared, IR) technology, and the like. The wireless communications module 160 may be one or more devices integrating at least one communication processing module. The wireless communications module 160 detects an electromagnetic wave through the antenna 2, performs frequency modulation and filtering processing on the electromagnetic wave signal, and transmits the processed signal to the processor 110. The wireless communications module 160 may also detect a to-be-transmitted signal from the processor 110, perform frequency modulation and amplification on the signal, and the frequency-modulated and amplified signal to an electromagnetic wave for radiation by using the antenna 2. For example, the wireless communications module 160 may include a Bluetooth module, a Wi-Fi module, and the like.

In some embodiments, in the first electronic device 100, the antenna 1 is coupled to the mobile communications module 150, and the antenna 2 is coupled to the wireless communications module 160, so that the first electronic device 100 can communicate with a network and other devices by using a wireless communications technology. The wireless communications technology may include global system for mobile communications (global system for mobile communications, GSM), general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, an IR technology, and/or the like. The GNSS may include the global positioning system (global positioning system, GPS), the global navigation satellite system (global navigation satellite system, GLONASS), the Beidou navigation satellite system (beidou navigation satellite system, BDS), the quasi-zenith satellite system (quasi-zenith satellite system, QZSS), and/or satellite based augmentation systems (satellite based augmentation systems, SBAS).

In this embodiment of this application, the wireless communications module 160 specifically may include a Bluetooth module and a satellite positioning module.

The Bluetooth module may provide a Bluetooth communications solution for application to the first electronic device 100. The Bluetooth module includes a Bluetooth controller. The Bluetooth controller is a chip integrated in the Bluetooth module and can control the Bluetooth module to scan for a Bluetooth signal and report a received Bluetooth signal to the processor 110.

In some embodiments, the Bluetooth module may scan periodically to obtain a Bluetooth signal sent by a first Bluetooth peripheral, and then report the Bluetooth signal sent by the first Bluetooth peripheral to the processor 110 of the first electronic device 100. After receiving the Bluetooth signal from the first Bluetooth peripheral, the processor 110 sends location information of the first electronic device 100 to a cloud server. The Bluetooth module receives the Bluetooth signal from the first Bluetooth peripheral, meaning that the first Bluetooth peripheral is near the first electronic device 100. Therefore, the location information reported by the first electronic device 100 is equivalent to location information of the first Bluetooth peripheral.

In some embodiments, the processor 110 may configure one or more signal filters for the Bluetooth controller. The Bluetooth controller uses a first signal filter of a plurality of signal filters to filter out a first Bluetooth signal from received Bluetooth signals and reports the filtered-out first Bluetooth signal to the processor 110, thereby triggering the processor 110 to record the location information.

The satellite positioning module may determine, based on a positioning system such as the global positioning system (Global Positioning System, GPS) or the Beidou system, a geographic location of the first electronic device 100, that is, the latitude and longitude of a location of the first electronic device 100.

The first electronic device 100 implements a display function by using the GPU, the display 194, the application processor, and the like. The GPU is an image processing microprocessor, and is connected to the display 194 and the application processor. The GPU is configured to perform mathematics and geometrical calculation for graphics rendering. The processor 110 may include one or more GPUs that execute program instructions to generate or change display information.

The internal memory 121 may be configured to store computer executable program code, and the executable program code includes an instruction.

The internal memory 121 may include a storage program area and a storage data area. The storage program area may store an operating system, an application required by at least one function (for example, a sound play function and an image play function), and the like. The data storage area may store data (such as audio data and contacts) created during use of the first electronic device 100, and the like. The internal memory 121 may store trajectory information of the first electronic device 100 and trajectory information of the first Bluetooth peripheral 300.

The foregoing is a specific description of this embodiment of this application made by using the first electronic device 100 as an example. It should be understood that the structure illustrated in this embodiment of this application does not constitute a specific limitation on the first electronic device 100. The first electronic device 100 may have more or fewer components than those shown in the figure, may combine two or more components, or may have different component configurations. Each component shown in the figure may be implemented in hardware that includes one or more signal processing and/or application-specific integrated circuits, in software, or in a combination of the hardware and the software.

Figure 5:
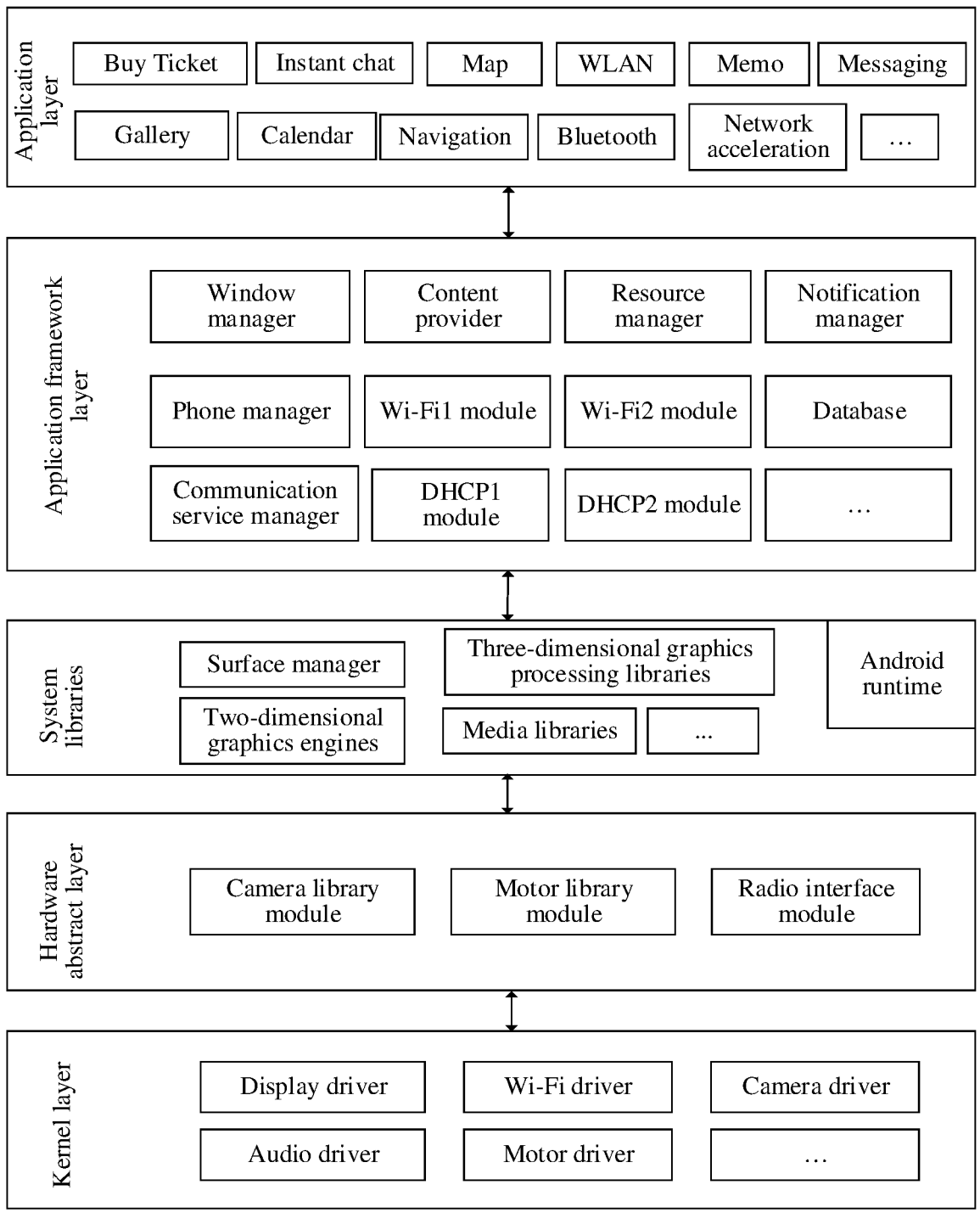
FIG. 5 is a schematic diagram of a software structure of the first electronic device 100 according to an embodiment of this application.

A software system of the first electronic device 100 may use a layered architecture, an event-driven architecture, a microkernel architecture, a microservice architecture, a cloud architecture, or the like, and details are not described herein. In this embodiment of this application, a software structure of the first electronic device 100 is described by using an Android system with a layered architecture as an example. FIG. 5 is a block diagram of a software structure of a first electronic device to which an embodiment of this application is applicable. In a layered architecture, a software system of the first electronic device 100 is divided into several layers, and each layer has a clear role and responsibility. The layers communicate with each other through software interfaces. In some embodiments, an Android system may be divided into five layers, which are an applications layer (applications), an application framework layer (application framework), an Android runtime (Android runtime) and system library, a hardware abstract layer (hardware abstract layer, HAL), and a kernel layer (kernel), respectively.

The application framework layer provides an API and a programming framework for applications at the applications layer. The application framework layer includes some predefined functions. As shown in FIG. 5, the application framework layer may include a window manager, a phone manager, an audio manager, a Bluetooth manager, a network data manager, a location information manager, a communication service manager, and the like.

The kernel layer is a layer between hardware and software. The kernel layer is configured to drive the hardware and make the hardware work. The kernel layer includes at least a display driver, a camera driver, an audio driver, a sensor driver, a motor driver, CPU scheduling, and the like. This is not limited in this embodiment of this application.

The hardware abstract layer may include a plurality of library modules, which for example may include a camera library module, a motor library module, a radio interface module (radio interface layer, ril), and the like. The Android system may load the corresponding library modules for device hardware, thereby realizing a purpose of accessing the device hardware by the application framework layer. The device hardware may include for example a motor, a camera, and a mobile communications module in the terminal device. The radio interface module may obtain a base station identifier of a camped-on base station from the mobile communications module.

The window manager is used to manage window programs. The window manager may obtain a display size, determine whether there is a status bar, lock a screen, capture a screen, and the like. A content provider is used to store and obtain data, and make the data accessible to an application. The data may include videos, images, audio, calls made and answered, and the like. A view system includes visual controls, for example controls with text displayed and controls with a picture displayed. The view system may be used to build an application program. A display screen may include one or more views. The phone manager is used to provide a communication function of the terminal device 100, for example, management of a call status (including answering or disconnected). The Bluetooth manager can be used to implement a Bluetooth function, such as enabling or disabling Bluetooth, control the Bluetooth module for data transmission, and the like. The network data manager may be configured to manage network data. The location information manager is used to manage a GPS module for acquisition of location information. The communication service manager, which is a telephony module, may be used to cache a base station identifier of a base station on which the first electronic device 100 camps.

The applications layer may include a series of application packages, and the application layer runs an application by calling an application programming interface (application programming interface, API) provided by the application framework layer. As shown in FIG. 5, an application package may include applications such as buy ticket, instant chat, calendar, map, navigation, WLAN, memo, and Bluetooth. The Bluetooth application may obtain, from the telephony module, the cached base station identifier of the base station on which the first electronic device 100 camps, and implement the device tracking detection method provided in this application.

Figure 6:
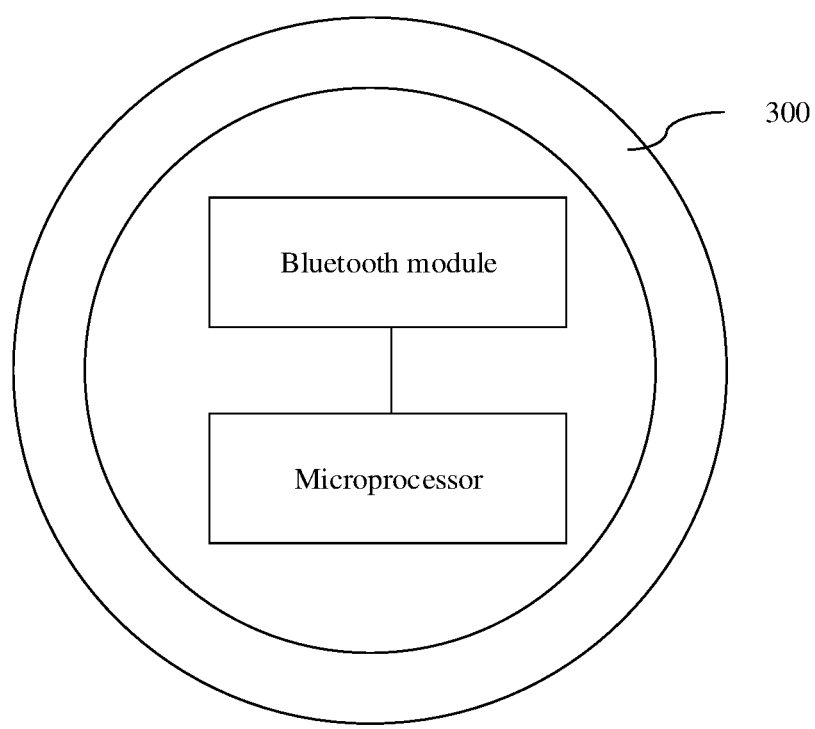
FIG. 6 is a schematic structural diagram of the first Bluetooth peripheral 300 according to an embodiment of this application.

Explanation of Patent Terms in this Application:

First Bluetooth peripheral: A user may place a first Bluetooth peripheral with items (for example, keys and a backpack) that are carried with the user. Therefore, the user can obtain location information of the first Bluetooth peripheral (that is, location information of an item) to position the item. As shown in FIG. 6, the first Bluetooth peripheral 300 includes a Bluetooth module and a Bluetooth controller. The Bluetooth controller is configured to control the Bluetooth module to broadcast a first Bluetooth signal.

First electronic device: This device may be user equipment (user equipment, UE), for example, a mobile phone, a tablet computer, a desktop computer, a laptop computer, a handheld computer, a netbook, and a personal digital assistant (personal digital assistant, PDA). In addition, the first electronic device also has a function of receiving the first Bluetooth signal.

Second electronic device: a device that can be used to position the first Bluetooth peripheral. The second electronic device is capable of continuously broadcasting a second Bluetooth signal. The second Bluetooth signal carries state information of the second electronic device. In this way, the state information may include information such as location information, battery level, and whether the Bluetooth function is normal.

Hash table: a data table that is accessed directly based on a key value (Key value). That is, in a hash table, a record is accessed by mapping a key value to a location in the table to speed up lookup. For example, given a table M, there is a function f(key). For any given keyword value key, if an address of a record containing the keyword in the table can be obtained after substituting the function, the table M is referred to as a hash table.

In the following, technical solutions in this application and how the technical solutions in this application resolve the foregoing technical problems are described in detail. Following several specific embodiments may be implemented separately or in combination, and same or similar concepts or processes may be omitted in some of the embodiments.

Figure 7A:
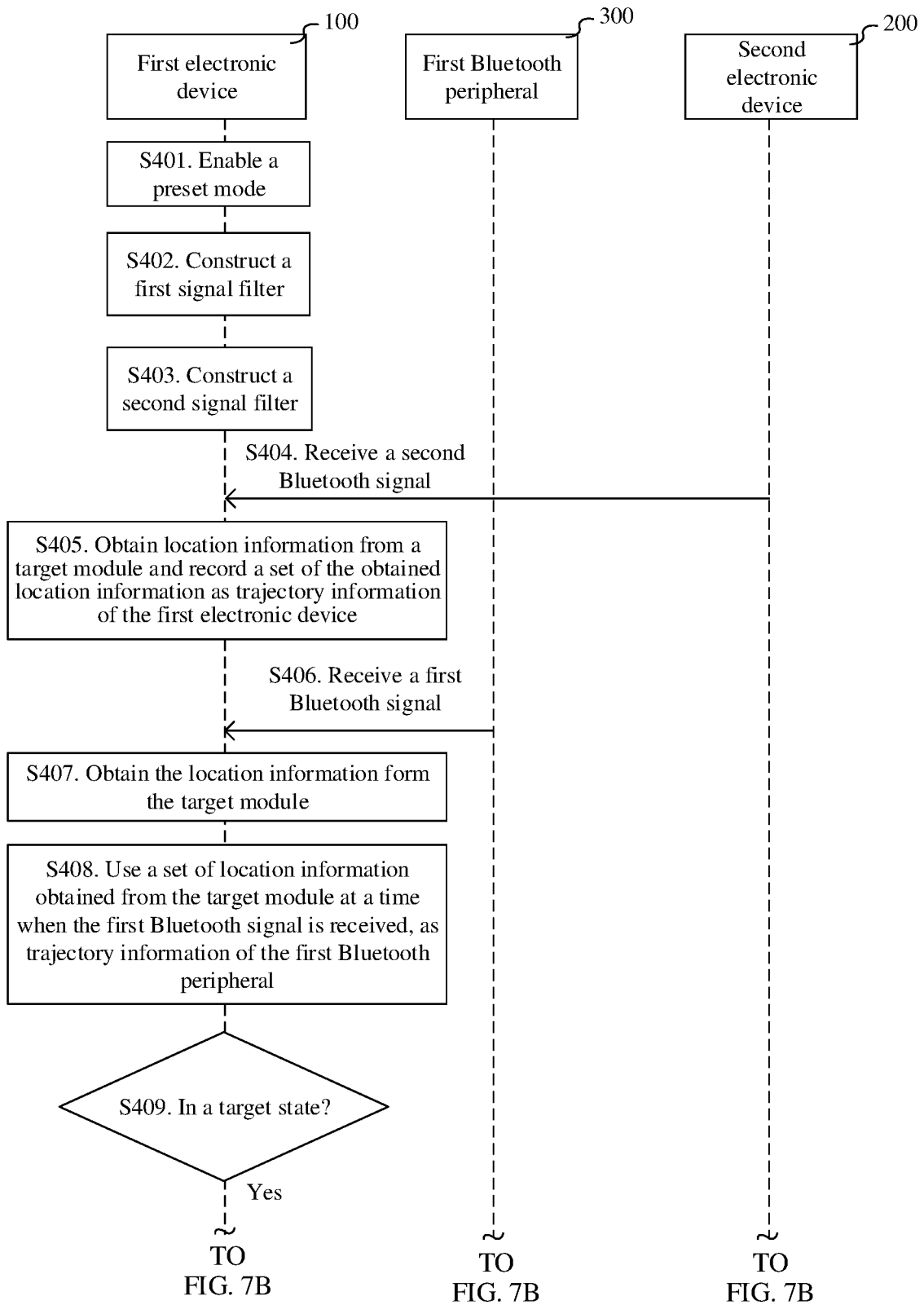
FIG. 7A and FIG. 7B are a flowchart of a device tracking detection method according to an embodiment of this application.
Figure 7B:
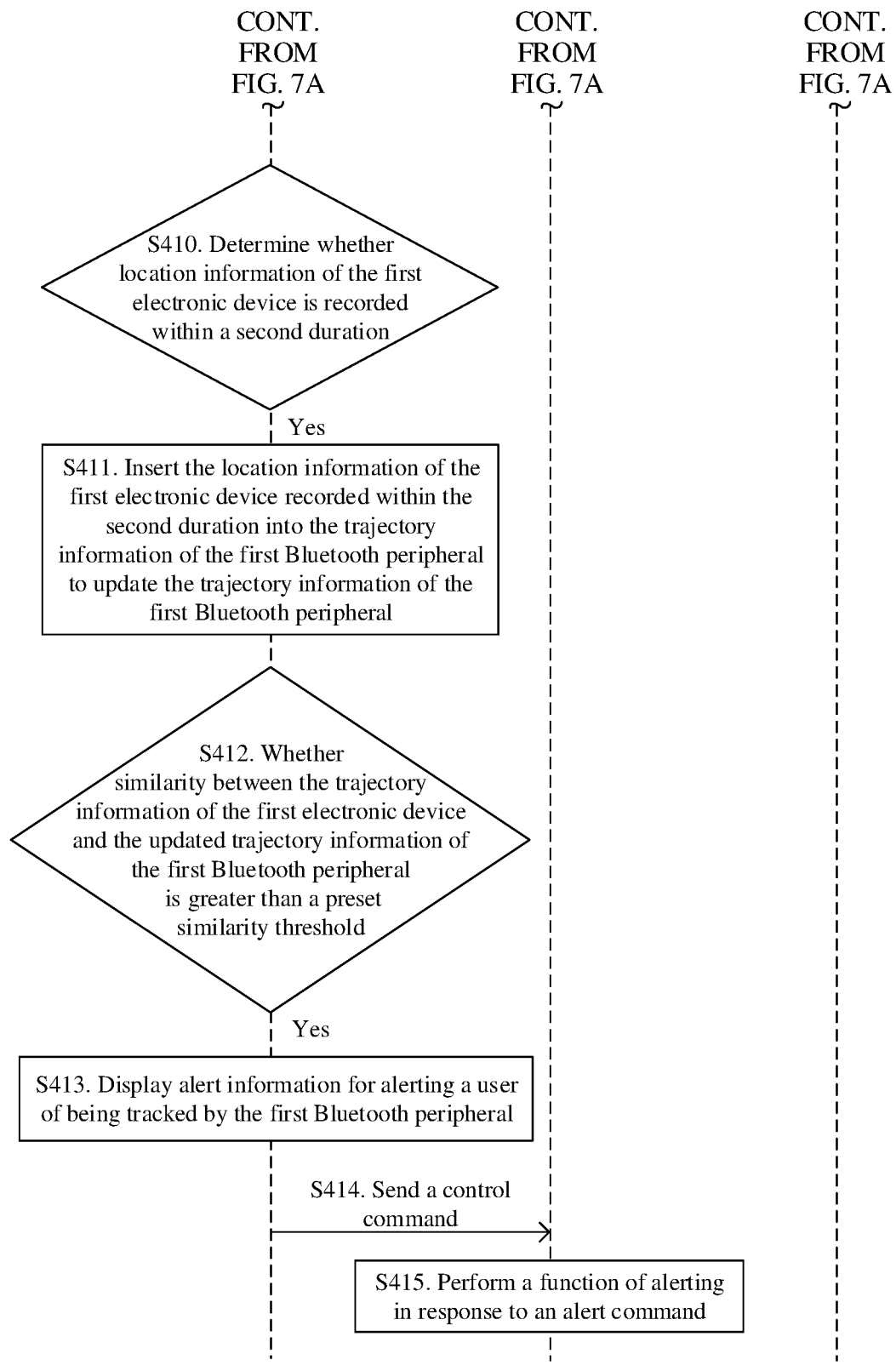

Referring to FIG. 7A and FIG. 7B, a device tracking detection method provided in an embodiment of this application may be performed by the first electronic device 100. The device tracking detection method provided in this embodiment of this application may specifically include the following steps.

S401. The first electronic device 100 enables a preset mode.

It can be understood that the first electronic device receives a first Bluetooth signal only in the preset mode, which can save power consumption and better meet user needs. In some embodiments, the first electronic device 100 may display a first screen. The first screen includes a first control, and the first control is used to indicate enabling of the preset mode. In this way, the first electronic device 100 enables the preset mode in response to a trigger operation by a user on the first control. The preset mode can be understood as a "tracking detection mode". In this way, the user can enable the preset mode by triggering the first control in the first screen, which is convenient and quick.

Figure 8:
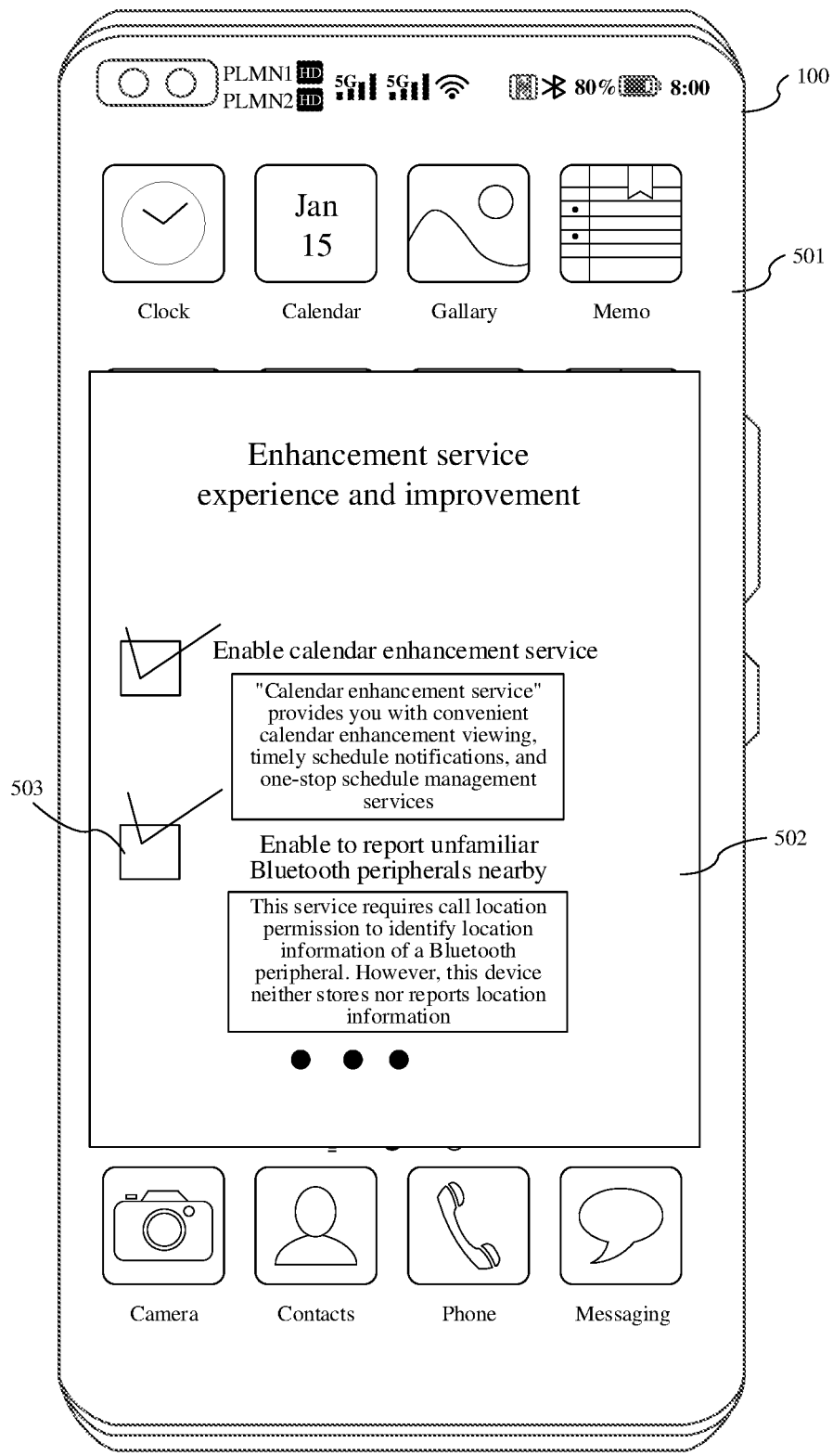
FIG. 8 is a first schematic screen diagram of enabling a preset mode according to an embodiment of this application.

For example, as shown in FIG. 8, when the first electronic device 100 is powered on for the first time after leaving the factory, the first electronic device 100 displays a system desktop 501 (that is, the first screen). Then, the first electronic device 100 displays a first prompt box 502 on the system desktop 501. The first prompt box 502 includes a first control 503. The first control 503 includes text information "Enable to report unfamiliar Bluetooth peripherals nearby" on one side, that is, the first control 503 is used to indicate enabling of a preset mode. The first electronic device 100 can enable the preset mode in response to a trigger operation by the user on the first control 503. In this way, the user can enable the preset mode simply from the system desktop 501, which is convenient and quick.

Figure 9:
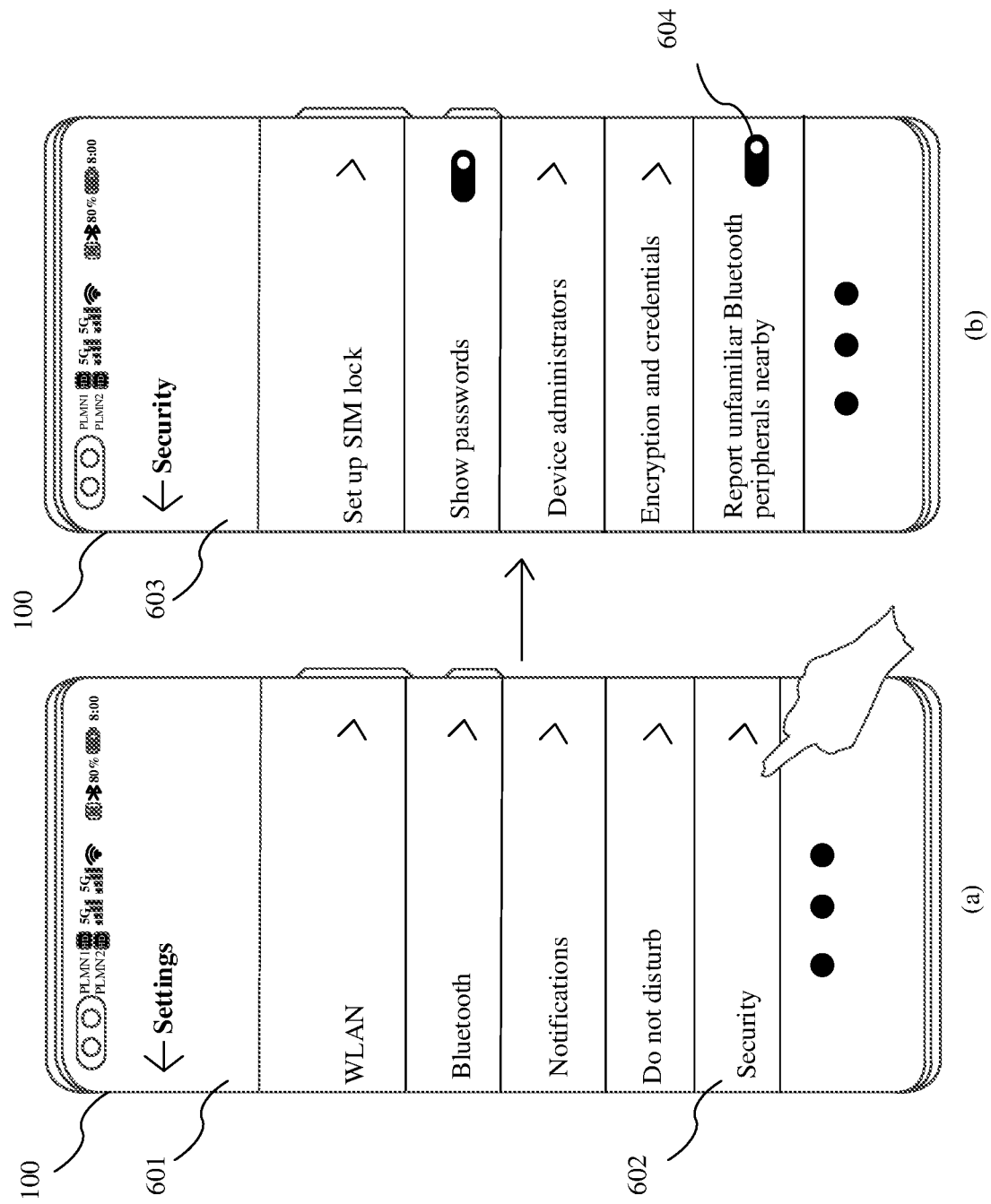
FIG. 9 is a second schematic screen diagram of enabling a preset mode according to an embodiment of this application.

For another example, as shown in (a) of FIG. 9, the first electronic device 100 may display a function list screen 601 in response to a trigger operation by the user on the "settings" icon on the system desktop. The function list screen 601 includes a security setting option 602. The first electronic device 100 may display a security function list screen 603 (that is, the first screen) in response to a trigger operation by the user on the security setting option 602. As shown in (b) of FIG. 9, the security function list screen 603 includes a first control 604. The first control 604 includes text information "Report unfamiliar Bluetooth peripherals nearby" on one side, that is, the first control 604 is used to indicate enabling of a preset mode. The first electronic device 100 can enable the preset mode in response to an enabling operation by the user on the first control 604. In this way, the user can enable the preset mode at any time after triggering the "settings" icon, which is convenient and quick.

In some other embodiments, in step S401, the first electronic device 100 may alternatively enable the preset mode after detecting that the user lights up the screen, or directly enable the preset mode after the first electronic device 100 is powered on, which is not limited herein.

The first electronic device 100 may alternatively enable the preset mode by default. In this case, the foregoing S401 may be omitted.

S402. The first electronic device 100 constructs a first signal filter.

In step S402, the first electronic device 100 needs to construct a corresponding first signal filter for the first Bluetooth signal, and then configure the first signal filter for a Bluetooth controller of the first electronic device 100, so that the Bluetooth controller of the first electronic device 100 starts scanning for Bluetooth signals and uses the first signal filter to identify the first Bluetooth signal from a plurality of received Bluetooth signals. In this way, the first electronic device 100 may receive the first Bluetooth signal based on the first signal filter.

The first electronic device 100 can construct the first signal filter as follows: When the first electronic device 100 needs to obtain the first Bluetooth signal, the first electronic device 100 may call a filter constructor provided by the operating system of the first electronic device 100 and input characteristic data of the first Bluetooth signal into the filter constructor, thereby constructing the first signal filter for the first Bluetooth signal.

The characteristic data of the first Bluetooth signal may include but is not limited to a Bluetooth peripheral name of the first Bluetooth peripheral, a MAC address of the first Bluetooth peripheral, service data, manufacturer data, and the like. It can be understood that the characteristic data may also include other types of data, which are not limited in this embodiment of this application. The service data is used to indicate a function of the first Bluetooth signal, and the manufacturer data is used to indicate a manufacturer of a device that has sent the first Bluetooth signal. For example, the first signal filter may be a Findmy filter.

In some other embodiments, the first electronic device 100 may be pre-configured with the first signal filter so that the foregoing S402 may be omitted.

S403. The first electronic device 100 constructs a second signal filter.

There is no precedence between S403 and S404.

The second signal filter may be constructed as follows: The first electronic device 100 obtains service data and corresponding manufacturer data (manufacturer ID) of a second Bluetooth signal, and then inputs the service data and manufacturer data of the second Bluetooth signal as input parameters into the filter constructor, so that the second signal filter constructed by the filter constructor can be obtained. For example, the second signal filter may be a nearby filter.

In some other embodiments, the foregoing first electronic device 100 may be alternatively pre-configured with the second signal filter so that the foregoing S403 may be omitted.

S404. The first electronic device 100 receives, based on the second signal filter, a second Bluetooth signal broadcast by a second electronic device 200.

It can be understood that only when the first electronic device 100 can receive, based on a second signal filter, a second Bluetooth signal broadcast by a second electronic device 200 nearby, a location of the user may be leaked to others. In this way, device tracking detection steps described in subsequent S405 to S414 may be performed only when the second Bluetooth signal broadcast by the second electronic device 200 is received, which can save power consumption of the first electronic device 100. The second electronic device 200 broadcasts the second Bluetooth signal every other first duration (for example, 2 seconds). In this way, the first electronic device 100 can receive, every other first duration, the second Bluetooth signal broadcast by the second electronic device 200.

Optionally, in some other embodiments, the foregoing S403 and S404 may also be omitted.

It can be understood that the foregoing S401 to S404 are preparatory steps for implementing the device tracking detection method provided in this application. After completing S401 to S404, the first electronic device 100 is ready for device tracking detection while being carried around by the user. With reference to S405 to S414, the following provides a description on how the first electronic device 100 implements device tracking detection.

S405. The first electronic device 100 obtains location information from a target module and records the obtained location information as location information of the first electronic device 100, where a set of the location information of the first electronic device 100 is trajectory information of the first electronic device 100 (that is, first trajectory information).

The target module is configured to cache location information of a location at which the first electronic device 100 is located. For example, the target module may be the foregoing communication service module (that is, a telephony module) located on a framework layer of an operating system of the first electronic device 100 in FIG. 5. The location information may include a base station identifier (that is, Cell information) of a base station on which the first electronic device 100 is camping. For example, when the base station identifier of the base station on which the first electronic device 100 is camping is Cell ID1, the location information cached in the target module is Cell ID1; and when a base station identifier of a base station on which the first electronic device 100 camps is Cell ID2, the location information cached in the target module is updated from Cell ID1 to Cell ID2. For example, the first electronic device 100 may camp on a base station through the mobile communications module shown in FIG. 4.

In this way, the first electronic device 100 may record the location information obtained from the target module as location information of the first electronic device 100. In addition, the first electronic device 100 receives, every other first duration, the second Bluetooth signal broadcast by the second electronic device 200, so that the first electronic device 100 also obtains location information from the target module every other first duration. A set of the obtained location information can be understood as the trajectory information of the first electronic device 100 (that is, the first trajectory information). It can be understood that a time interval between two pieces of adjacent location information recorded in the first trajectory information is the first duration.

In addition, the location information may further include a time at which the first electronic device 100 collected a base station identifier, a field for indicating whether a base station is located along a high-speed railway, and the like, which is not limited herein.

In some embodiments, the first electronic device 100 may create a corresponding first data table for physical addresses of the first electronic device 100. Then, the first electronic device 100 may insert the location information of the first electronic device 100 that is obtained each time into the first data table. In this way, the first electronic device 100 can use the first data table to record the location information of the first electronic device 100, which is convenient and quick. It can be understood that the set of the location information in the first data table is the trajectory information of the first electronic device 100. For example, the first data table could be a hashtable table, that is, a hash table. In the hash table, a physical address of the first electronic device 100 may be used as a "key" of the hashtabletable, and recorded location information of the first electronic device 100 may be used as a "value" of the hashtable table. Specific content of the first data table may be shown in Table 1 below.

TABLE 1

| Physical address of first electronic device | Base station ID | Time | Field for indicating that a base station is located along a high-speed railway |
|---|---|---|---|
| MAC address 1 | Cell ID1 | 09:00:00 | "1" |
| | Cell ID2 | 09:00:02 | "1" |
| | Cell ID3 | 09:00:04 | "1" |
| | Cell ID4 | 09:00:06 | "1" |
| | . . . | . . . | "1" |
| | Cell IDn | 09:30:00 | "1" |

In Table 1, the field "1" is used to indicate that a base station is located along a high-speed railway. In addition, in this embodiment of this application, the location information of the first electronic device 100 may alternatively be stored in another way. For example, the location information of the first electronic device 100 is stored in a form of a data queue, which is not limited herein.

S406. The first electronic device 100 receives a first Bluetooth signal based on a first signal filter.

For example, each time the first electronic device 100 receives a Bluetooth signal, the Bluetooth signal may be compared with each configured signal filter, and if it is found that the Bluetooth signal carries one piece of characteristic information of the first signal filter, the first electronic device 100 can identify that the Bluetooth signal is a signal of a type corresponding to the first signal filter, that is, the first Bluetooth signal broadcast by the first Bluetooth peripheral 300.

S407. The first electronic device 100 obtains location information from the target module when receiving the first Bluetooth signal.

It can be understood that because when the first electronic device 100 receives the first Bluetooth signal based on the first signal filter, it implies that the first Bluetooth peripheral 300 is near the first electronic device 100. In this way, the first electronic device 100 can obtain location information from the target module at a time when the first Bluetooth signal is received. It can be understood that when the first electronic device 100 receives the first Bluetooth signal, the first Bluetooth peripheral 300 is near the first electronic device 100. In this way, the location information obtained from the target module at the time when the first Bluetooth signal is received can be used as location information of the first Bluetooth peripheral 300 at the time when the first Bluetooth signal is received.

S408. The first electronic device 100 records the location information obtained at the time when the first Bluetooth signal is received, as the location information of the first Bluetooth peripheral 300. A set of the location information of the first Bluetooth peripheral 300 is trajectory information of the first Bluetooth peripheral 300 (that is, second trajectory information).

For example, the first electronic device 100 may create, based on an identifier of the first Bluetooth peripheral 300 (for example, a MAC address of the first Bluetooth peripheral 300), a corresponding second data table for storing the location information of the first Bluetooth peripheral 300. The first electronic device 100 stores the location information obtained from the target module each time when the first Bluetooth signal is received in the second data table corresponding to the identifier of the first Bluetooth peripheral 300. In this way, the first electronic device 100 can use the second data table to record the location information of the first Bluetooth peripheral 300, which is convenient and quick. For example, the second data table could also be a hashtable table, that is, a hash table. In the hash table, an identifier of the first Bluetooth peripheral 300 may be used as a "key", and location information of the first Bluetooth peripheral 300 at the time when the first Bluetooth signal is received may be used as a "value". In this case, content of the second data table may be shown in Table 2 below.

TABLE 2

| Physical address of first Bluetooth peripheral | Base station ID | Time | Field for indicating that a base station is located along a high-speed railway |
|---|---|---|---|
| MAC address 2 | Cell ID1 | 09:00:00 | "1" |
| | Cell ID2 | 09:00:06 | "1" |
| | Cell ID3 | 09:00:12 | "1" |
| | . . . | . . . | "1" |
| | Cell IDn | 09:30:00 | "1" |

S409. The first electronic device 100 determines whether it is in a target state; and if yes, the first electronic device 100 performs S410. The target state is a state in which a moving speed of the first electronic device 100 is greater than a preset speed threshold (for example, 25 m/s).

For example, the first electronic device 100 obtains target information. The target information is information characterizing the moving speed of the first electronic device 100. The first electronic device 100 detects, based on the target information, whether the first electronic device 100 is in the target state.

The following describes several methods of how the first electronic device 100 determines whether it is in a target state by using an example of the target state being a moving state in which a moving speed of the first electronic device 100 is greater than a first speed threshold. It can be understood that when the moving speed of the first electronic device 100 is greater than the first speed threshold (for example, 25 m/s), the first electronic device 100 is in a moving state because of being carried with the user on a high-speed train.

First method: The target information is location information. The first electronic device 100 can identify whether the location information obtained from the target module carries a field (for example, a binary number "1") used to indicate that a base station is located along a high-speed railway, if yes, the first electronic device 100 determines that it is in the target state; or if no, the first electronic device 100 determines that it is not in the target state.

Second method: The target information is moving speed. The first electronic device 100 detects a moving speed. Then, the first electronic device 100 determines whether the moving speed is greater than a preset first speed threshold (for example, 25 m/s), if yes, the first electronic device 100 determines that it is in the target state; or if no, the first electronic device 100 determines that it is not in the target state.

Third method: The target information is itinerary information recorded in an application program, where the itinerary information is used to indicate that the user is riding a high-speed train during a target period. When in the target period, the first electronic device 100 determines that it is in the target state; while not in the target period, the first electronic device 100 determines that it is not in the target state.

For example, if a user buys a high-speed train ticket for a target period in a buy ticket application, the first electronic device 100 records information of the high-speed train ticket (that is, recorded itinerary information). In this way, when in the target period, the first electronic device 100 determines that the first electronic device 100 is in the target state. For another example, a message record by the user in a messaging application or instant chat application includes "The user rides a high-speed train in the target period". In this way, when in the target period, the first electronic device 100 determines that the first electronic device 100 is in the target state. For another example, the user records an itinerary in a calendar application: The user rides a high-speed train in the target period. In this way, when in the target period, the first electronic device 100 determines that it is in the target state; while not in the target period, the first electronic device 100 determines that it is not in the target state.

It should be noted that the foregoing three methods for determining whether the electronic device is in a target state are not the only methods, but are merely examples herein. For example, the first electronic device 100 may also determine whether the first electronic device 100 is in the target state by combining the foregoing three methods or any two of them, which is more reliable.

S410. The first electronic device 100 determines whether location information of the first electronic device 100 is recorded within a second duration; and if yes, the first electronic device 100 performs S411.

It should be noted that the second duration (for example, 6 seconds) is longer than the first duration (for example, 2 seconds), and that the second duration is terminated at a time when the first Bluetooth signal is received. The second duration is a period duration during which the first Bluetooth peripheral 300 broadcasts the first Bluetooth signal.

For example, the first electronic device 100 may determine, from the first data table, whether the location information of the first electronic device 100 is recorded within the second duration.

S411. The first electronic device 100 inserts the location information of the first electronic device 100 recorded within the second duration into the trajectory information of the first Bluetooth peripheral 300 to update the trajectory information of the first Bluetooth peripheral 300.

Based on the foregoing description of S407, the first electronic device 100 may insert the location information of the first electronic device 100 recorded in a first data structure within the second duration into the second data table. In this case, a set of the location information recorded in the second data table is the trajectory information of the first Bluetooth peripheral 300 (that is, second trajectory information). In this case, content of the second data table may be shown in Table 3 below.

TABLE 3

| Physical address of first Bluetooth peripheral | Base station ID | Time | Field for indicating that a base station is located along a high-speed railway |
|---|---|---|---|
| MAC address 2 | Cell ID1 | 09:00:00 | "1" |
|  | Cell ID2 | 09:00:02 | "1" |
|  | Cell ID3 | 09:00:04 | "1" |
|  | Cell ID4 | 09:00:06 | "1" |
|  | . . . | . . . | "1" |
|  | Cell IDn | 09:30:00 | "1" |

In Table 3, the field "1" is used to indicate that a base station is located along a high-speed railway. It can be seen that compared with the data content in Table 2, the data content in Table 3 is more abundant, more substantial, and more reliable. In addition, in this embodiment of this application, the location information of the first electronic device 100 may alternatively be stored in another way. For example, the location information of the first electronic device 100 is stored in a form of a data queue, which is not limited herein.

It can be understood that because the first Bluetooth peripheral 300 broadcasts the first Bluetooth signal only once every other second duration, it implies that the first Bluetooth peripheral 300 may also be near the first electronic device 100 within the second duration during which the first Bluetooth signal is received.

Therefore, when the moving speed is greater than a preset speed threshold, the trajectory information of the first Bluetooth peripheral 300 recorded by the first electronic device 100 includes not only the location information obtained from the target module by the first electronic device 100 when receiving the first Bluetooth signal, but also the location information of the first electronic device 100 in the first trajectory information within the second duration during which the first Bluetooth signal is received. Then, content of the trajectory information of the first Bluetooth peripheral 300 obtained by the first electronic device 100 is more abundant with higher reliability.

The following describes the foregoing S411 by using an example of the target state being a moving state in which a moving speed of the first electronic device 100 is greater than a first speed threshold (that is, the first electronic device 100 is in a moving state because of being carried with the user on a high-speed train) and of the location information cached in a target module including base station identifier(s).

When the first electronic device 100 is carried with the user on the high-speed train, the first electronic device 100 may successively camp on base stations along the railway that the high-speed train has passed. In this way, the target module of the first electronic device 100 may cache base station identifier(s) of camped-on base station(s). The first electronic device 100 can obtain the base station identifier(s)

from the target module every other first duration (for example, 2 seconds). In this way, while moving along the high-speed railway, the first electronic device 100 can successively obtain, from the target module, base station identifiers of each of base stations along the railway that the high-speed train has passed.

Figure 10:
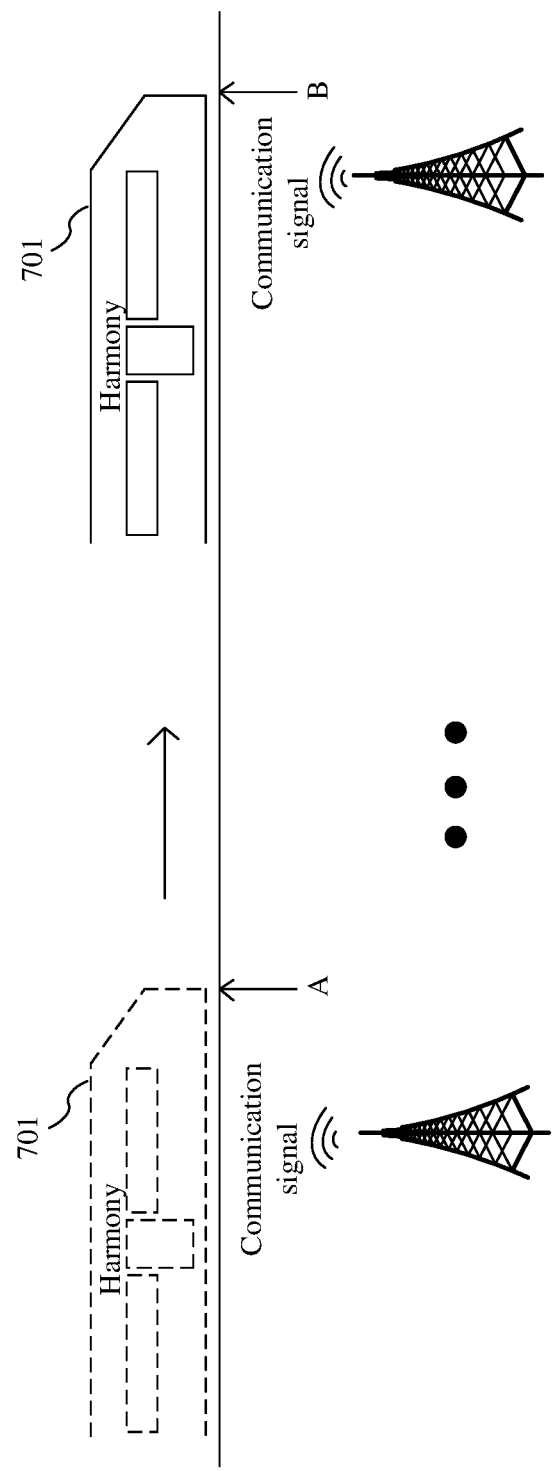
FIG. 10 is a schematic diagram of a device tracking detection method applied to a high railway scenario according to an embodiment of this application.

As shown in FIG. 10, in some embodiments, in traveling from location A to location B within a second duration (for example, 6 seconds), a high-speed train 701 has passed 5 base stations and a camping time on each base station is less than or equal to a first duration (for example, 2 seconds), so that the first electronic device 100 can obtain base station identifiers of five base stations from the target module. For example, the five base station identifiers obtained by the first electronic device 100 may be cellID1, cellID2, cellID3, cellID4, and cellID5, which are not limited herein. A set of base station identifiers (cellID1, cellID2, cellID3, cellID4, cellID5) can be used as trajectory information of the first electronic device 100 within the second duration. By analogy, the first electronic device 100 can obtain base station identifiers of all base stations that the high-speed train 701 has passed after the train departs and use the identifiers as the trajectory information of the first electronic device 100 on the high-speed train 701.

Still as shown in FIG. 10, in some other embodiments, in traveling from location A to location B within a second duration (for example, 6 seconds), the high-speed train 701 has passed 5 base stations and a camping time on a base station with a base station identifier of cellID2 is greater than a first duration (for example, 2 seconds) and less than twice the first duration. For example, the base station identifiers that the first electronic device 100 obtains within the second duration may be cellID1, cellID2, cellID2, cellID3, cellID4, and cellID5. A set of base station identifiers (cellID1, cellID2, cellID2, cellID3, cellID4, cellID5) can be used as trajectory information of the first electronic device 100 within the second duration.

In addition, to save storage space and a calculation amount of subsequent similarity comparison, the first electronic device 100 can obtain a set of base station identifiers by deduplicating same base station identifiers in the base station identifiers obtained within the second duration. For example, the first electronic device 100 can remove one "cellID2" from the obtained base station identifiers cellID1, cellID2, cellID2, cellID3, cellID4, and cellID5 to obtain a set of base station identifiers (cellID1, cellID2, cellID3, cellID4, cellID5).

It can be understood that when the user rides the high-speed train 701 with a luggage bag containing the first Bluetooth peripheral 300 and the first electronic device 100, the first Bluetooth peripheral 300 may broadcast the first Bluetooth signal every other second duration (for example, 6 seconds). In this way, the first electronic device 100 can receive the first Bluetooth signal based on a first signal filter every other second duration. Still as shown in FIG. 10, when the high-speed train 701 travels to the location B, the first electronic device 100 receives the first Bluetooth signal based on the first signal filter. The first electronic device 100 can obtain a base station identifier "cellID5" of a base station 703 from the target module at a time when the first electronic device 100 receives the first Bluetooth signal.

It can be understood that because when the first electronic device 100 receives the first Bluetooth signal based on the first signal filter, it implies that the first Bluetooth peripheral 300 is near the first electronic device 100. In this way, the recorded base station identifier "cellID5" can be used as location information of the first Bluetooth peripheral 300.

In addition, because the first Bluetooth peripheral 300 broadcasts the first Bluetooth signal only once every other second duration, the first Bluetooth peripheral 300 may be near the first electronic device 100 within the second duration during which the first Bluetooth signal is received based on the first signal filter. However, because the first electronic device 100 and the first Bluetooth peripheral 300 are both located on the high-speed train 701 and the moving speed is greater than a preset speed threshold, the first electronic device 100 and the first Bluetooth peripheral 300 may have passed a plurality of base stations within the second duration. In this way, the first electronic device 100 can also obtain base station identifiers within the second duration from trajectory information of the first electronic device 100 and use the identifiers as information about locations that the first Bluetooth peripheral 300 has passed.

Still as shown in FIG. 10, when the high-speed train 701 has also passed 4 base stations within the second duration in traveling to the location B, the first electronic device 100 also uses base station identifiers (cellID1, cellID2, cellID3, cellID4) of the 4 base stations recorded within the second duration as information about locations that the first Bluetooth peripheral 300 has passed. In this way, the trajectory information of the first Bluetooth peripheral 300 within the second duration is (cellID1, cellID2, cellID3, cellID4, cellID5). Therefore, the first electronic device 100 can supplement missing location information of the first Bluetooth peripheral 300. Then, content of the trajectory information of the first Bluetooth peripheral 300 on the high-speed train 701 obtained by the first electronic device 100 is more abundant with higher reliability.

It can be understood that when receiving the first Bluetooth signal next time, the first electronic device 100 may also use the base station identifiers in the first trajectory information within the second duration during which the first Bluetooth signal is received, to supplement missing location information of the first Bluetooth peripheral 300, and such a cycle is repeated until the first electronic device 100 determines that the first electronic device 100 is not in the target state.

S412: When a preset condition is met, the first electronic device 100 determines whether similarity between the trajectory information of the first electronic device 100 and the updated trajectory information of the first Bluetooth peripheral 300 is greater than a preset similarity threshold, and if yes, the first electronic device 100 performs S413.

The foregoing preset condition may be that a screen of the first electronic device 100 is touched and lights up, or that the trajectory information of the first Bluetooth peripheral 300 recorded by the first electronic device 100 is greater than a preset distance threshold, or the like, which is not limited herein.

In some embodiments, the first electronic device 100 may calculate the similarity between the trajectory information of the first electronic device 100 (that is, first trajectory information) and the updated trajectory information (that is, second trajectory information) of the first Bluetooth peripheral 300 by the following manner calculating, by the first electronic device 100 based on an equation $$S = \frac{N1}{N2},$$

the similarity between the trajectory information of the first electronic device 100 and the updated trajectory information of the first Bluetooth peripheral 300, where N1 is a quantity of base station identifiers in the updated trajectory information of the first Bluetooth peripheral 300, N2 is a quantity of base station identifiers in the trajectory information of the first electronic device 100, and S is the similarity between the trajectory information of the first electronic device 100 and the updated trajectory information of the first Bluetooth peripheral 300.

It can be understood that based on the foregoing description of FIG. 10, the trajectory information of the first electronic device 100 may include same base station identifier(s), that is, the set of location information of the first electronic device 100 is not deduplicated. Similarly, the trajectory information of the first Bluetooth peripheral 300 may also include same base station identifier(s), that is, the set of location information of the first Bluetooth peripheral 300 is not deduplicated.

Alternatively, each of base station identifiers included in the trajectory information of the first electronic device 100 is different, that is, the set of location information of the first electronic device 100 is deduplicated. Similarly, each of base station identifiers included in the trajectory information of the first Bluetooth peripheral 300 is also different, that is, the set of location information of the first Bluetooth peripheral 300 is also deduplicated. When the set of location information of the first electronic device 100 is deduplicated, and the set of location information of the first Bluetooth peripheral 300 is deduplicated, a calculation amount can be reduced and computing resources can be saved.

In addition, the preset similarity threshold may be 60%, 70%, 80%, or the like, which is not limited herein.

In some application scenarios, the preset threshold is 60%, and both the trajectory information of the first electronic device 100 and the updated trajectory information of the first Bluetooth peripheral 300 are recorded when the high-speed train 701 is in a moving state. When the user carrying the first electronic device 100 is not far away from the luggage bag on a seat, the first electronic device 100 can receive the first Bluetooth signal of the first Bluetooth peripheral 300 in the luggage bag through the first signal filter every other second duration. Therefore, it can be seen from the foregoing solutions involved in S405 to S411 that when the first electronic device 100 does not miss receiving the first Bluetooth signal, the recorded trajectory information of the first electronic device 100 is the same as the updated trajectory information of the first Bluetooth peripheral 300, that is, calculated similarity is 1. It can be seen that the similarity between the trajectory information of the first electronic device 100 and the updated trajectory information of the first Bluetooth peripheral 300 is greater than the preset similarity threshold of 60%.

It can be seen that when the first electronic device 100 is not far from the first Bluetooth peripheral 300, the recorded trajectory information of the first electronic device 100 is the same as the trajectory information of the first Bluetooth peripheral 300.

In some other application scenarios, the preset threshold is 60%, and both the trajectory information of the first electronic device 100 and the updated trajectory information of the first Bluetooth peripheral 300 are obtained when the high-speed train 701 is in a moving state. When the user carrying the first electronic device 100 is far away from the luggage bag on the seat for 300 seconds (more than a preset duration) (for example, the user carrying the first electronic device 100 moves away from the seat to go to the toilet, fetch water, or the like), the first electronic device 100 cannot receive the first Bluetooth signal broadcast by the first Bluetooth peripheral 300 within the 300 seconds during which the first electronic device 100 leaves the seat. In this way, it can be seen from the foregoing solutions involved in S405 to S411 that the base station identifiers obtained by the first electronic device 100 from the target module during this period (that is, the foregoing 300 seconds) are not used as part of the updated trajectory information of the first Bluetooth peripheral 300. After the user carrying the first electronic device 100 is back to the seat, the first electronic device 100 can receive the Bluetooth signal broadcast by the first Bluetooth peripheral 300 again every other second duration. In this way, a set of base station identifiers obtained from the target module at a time when the first Bluetooth signal is received and location information recorded within the second duration in the first data structure are then taken by the first electronic device 100 as part of the updated trajectory information of the Bluetooth peripheral 300.

It is assumed that when arriving at a terminal station, the high-speed train 701 has passed a total of 2700 base stations from a departure station, the trajectory information of the first electronic device 100 recorded by the first electronic device 100 includes 2700 base station identifiers. However, in the 300 seconds during which the first electronic device 100 was far away from the luggage bag on the seat, base station identifiers recorded by the first electronic device 100 include 300 base station identifiers. In this way, trajectory information of the first Bluetooth peripheral 300 recorded by the first electronic device 100 include 2400 base station identifiers. Then, similarity $$S = \frac{2400}{2700}$$

calculated by the first electronic device 100 is 88%. It can be seen that the similarity between the trajectory information of the first electronic device 100 and the updated trajectory information of the first Bluetooth peripheral 300 is greater than the preset similarity threshold of 60%. Then, the first electronic device 100 can determine that it is tracked by the first Bluetooth peripheral 300.

In some other application scenarios, the preset threshold is 60%, and both the trajectory information of the first electronic device 100 and the updated trajectory information of the first Bluetooth peripheral 300 are obtained when the high-speed train 701 is in a moving state. When a user A carrying the first electronic device 100 starts to ride a high-speed train, a luggage bag of a user B who is seated next to the user A contains the first Bluetooth peripheral 300. In this case, the first electronic device 100 can receive the first Bluetooth signal broadcast by the first Bluetooth peripheral 300 every other second duration. If when traveling to a stop C from a departure station, the high-speed train 701 has passed 1500 base stations. Therefore, it can be seen from the foregoing solutions involved in S405 to S411 that 1500 base station identifiers obtained by the first electronic device 100 from the target module can be used as updated trajectory information of the first Bluetooth peripheral 300. However, if the user B that carries the luggage bag containing the first Bluetooth peripheral 300 gets off the train at the stop C, from the stop C to a terminal station of the high-speed train, the first electronic device 100 cannot receive the first Bluetooth signal broadcast by the first Bluetooth peripheral 300. In this way, from the stop C to the terminal station of the high-speed train, base station identifiers obtained by the first electronic device 100 from the target module cannot be used as part of updated trajectory information of the first Bluetooth peripheral 300.

Assuming that when arriving at the terminal station, the high-speed train 701 has passed a total of 2700 base stations from the departure station, the trajectory information of the first electronic device 100 recorded by the first electronic device 100 includes 2700 base station identifiers, and that recorded updated trajectory information of the first Bluetooth peripheral 300 includes 1500 base station identifiers. Then, similarity $$S = \frac{1500}{2700}$$

calculated by the first electronic device 100 is 55%. It can be seen that the similarity between the trajectory information of the first electronic device 100 and the trajectory information of the first Bluetooth peripheral 300 is less than the preset similarity threshold of 60%. In other words, the first electronic device 100 can determine that it is not tracked by the first Bluetooth peripheral 300.

S413. The first electronic device 100 displays alert information for alerting the user of being tracked by the first Bluetooth peripheral 300. In some embodiments, when the user needs to be alerted, the first electronic device 100 can pop up an alert message at the top of the display. In this case, the user can pull down a message notification bar from the top of the display to view the alert message.

Figure 11:
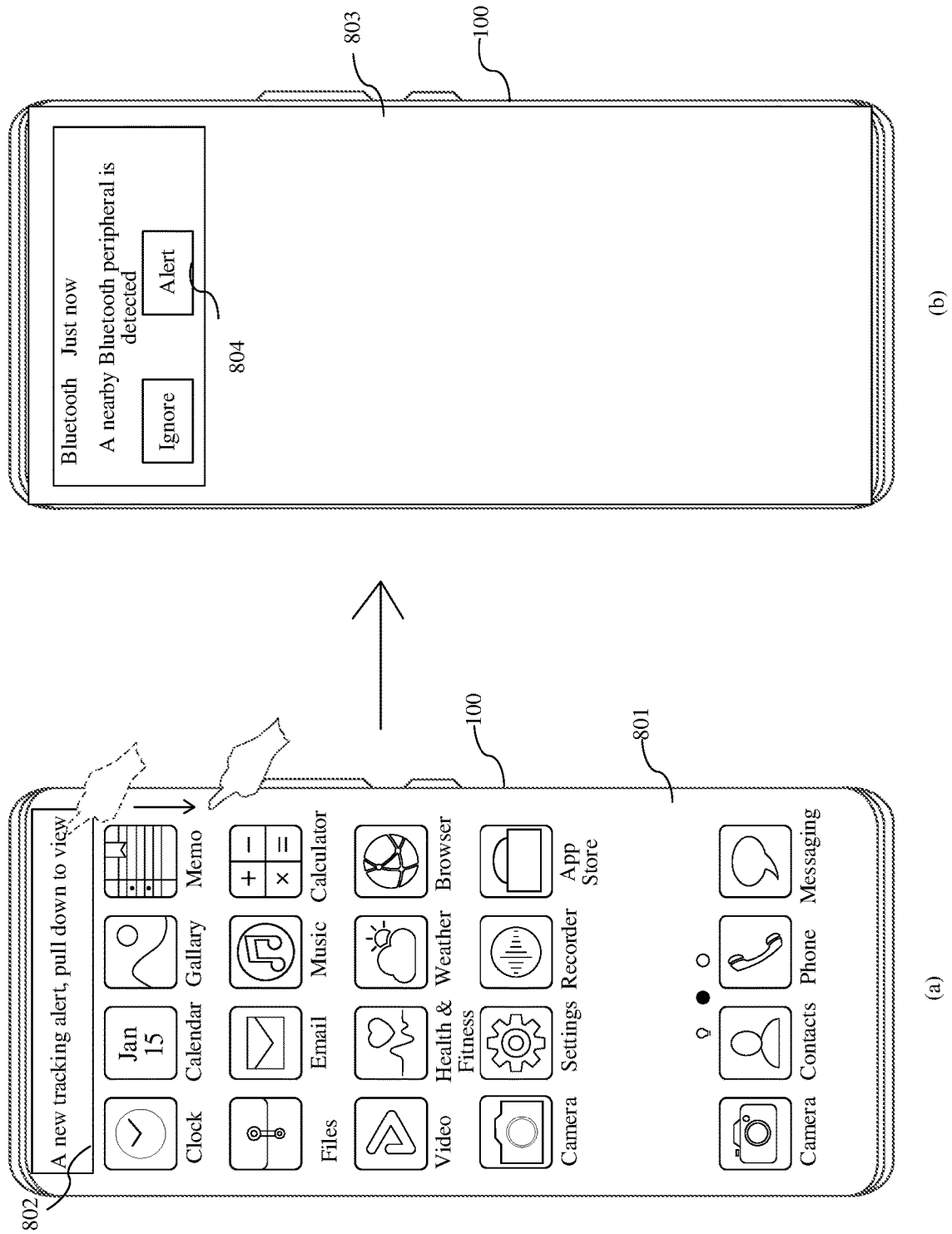
FIG. 11 is a schematic screen diagram of the first electronic device 100 providing an alert of being tracked by the first Bluetooth peripheral 300 according to an embodiment of this application.

As shown in (a) of FIG. 11, the first electronic device 100 displays a system desktop 801. The first electronic device 100 displays alert information 802 "A new tracking alert, pull down to view" in a navigation bar of the system desktop 801. The first electronic device 100 displays a notification bar 803 in response to a pull-down operation by the user on the navigation bar. As shown in (b) of FIG. 11, the notification bar 803 includes content of the alert message 802 "A nearby Bluetooth peripheral is detected". In this way, the user can be alerted that he/she is tracked by the first Bluetooth peripheral 300. In this way, the user only needs to perform a pull-down operation on the navigation bar to perceive the alert information, which is convenient and quick.

In addition, the content of the alert information may also include: a physical address (for example, which may be a MAC address of the first Bluetooth peripheral 300) carried in a latest Bluetooth signal sent by the first Bluetooth peripheral 300 that is tracking, and a distance (not shown in the figure) between the first Bluetooth peripheral 300 that is tracking and the first electronic device 100. The distance between the first Bluetooth peripheral 300 that is tracking and the first electronic device 100 can be calculated by the first electronic device 100 based on RSSI data of the first Bluetooth signal sent by the first Bluetooth peripheral 300.

S414. The first electronic device 100 sends a control command to the first Bluetooth peripheral 300 in response to a trigger operation by the user for the alert information.

S415. The first Bluetooth peripheral 300 performs a function of alerting in response to an alert command.

Figure 12:
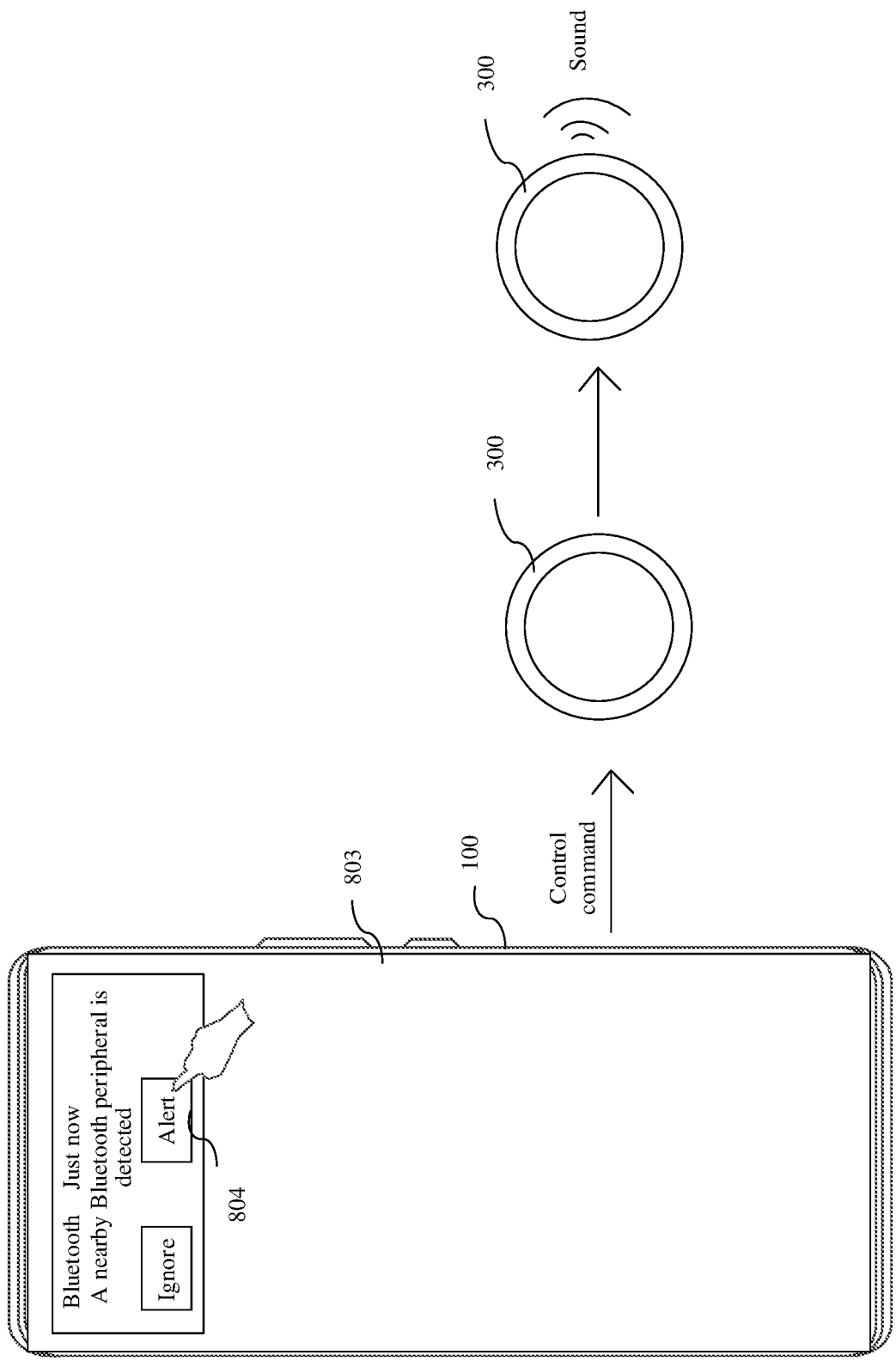
FIG. 12 is a schematic diagram of the first electronic device 100 controlling the first Bluetooth peripheral 300 to perform a function of alerting according to an embodiment of this application.

As shown in FIG. 12, the notification bar 803 may further include a second control 804, and the second control 804 is used to instruct the first Bluetooth peripheral 300 to perform an alerting operation. The first electronic device 100 may further establish a Bluetooth connection with the first Bluetooth peripheral 300 in response to a trigger operation by the user on the second control 804. Then, still as shown in FIG. 12, the first electronic device 100 may send a control command to the first Bluetooth peripheral 300. The first Bluetooth peripheral 300 emits sound or vibrates after receiving the control command, to facilitate the user to find the first Bluetooth peripheral 300.

The foregoing embodiment describes that the first electronic device 100 performs the function of alerting by using an example in which the first electronic device 100 displays alert information. In some other embodiments, the first electronic device 100 may alternatively perform the function of alerting in, but not limited to, the following two implementations:

First implementation: When the first electronic device 100 detects that it is tracked by the first Bluetooth peripheral 300, if the first electronic device 100 is in a dormant state (that is, the user does not use the first electronic device 100), the first electronic device 100 can output alert information through one or more components of the first electronic device 100. For example, the first electronic device 100 triggers a motor of the first electronic device 100 to start vibrating, or outputs an alert tone through a speaker of the first electronic device 100, or controls one or more light indicators of the first electronic device 100 to blink. The alert tone output by the speaker may be a preset ring tone, or may be an alert voice synthesized by the first electronic device 100.

Figure 13:
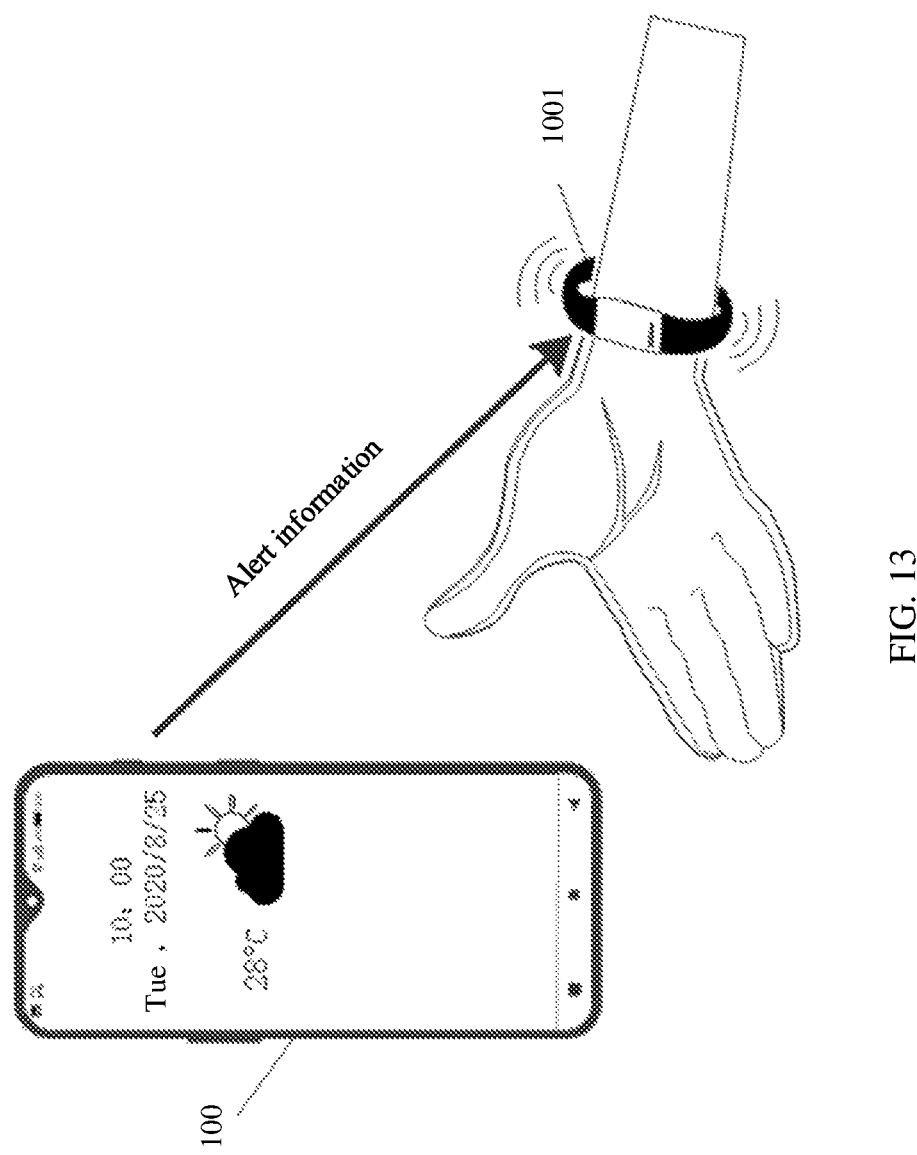
FIG. 13 is a schematic diagram of the first electronic device 100 controlling a wearable device to perform a function of alerting according to an embodiment of this application.

Second implementation: When the user wears one or more wearable devices which have established communication connections with the first electronic device 100, the first electronic device 100 can send alert information to these wearable devices that are communicatively connected, to trigger the wearable devices to perform corresponding actions to alert the user. For example, as shown in FIG. 13, when the first electronic device 100 is in communication connection with a bracelet 1001 worn by the user on a wrist, the first electronic device 100 sends alert information to the bracelet 1001, and then the bracelet 1001 starts to vibrate and output an alert tone in response to the alert information.

In addition, when meeting a preset condition, the first electronic device 100 stops receiving the first Bluetooth signal. For example, when in power off, the first electronic device 100 stops receiving the first Bluetooth signal. For another example, the first electronic device 100 may alternatively disable the preset mode in response to a disabling operation by the user on the first control 604 in FIG. 9. In this way, the first electronic device 100 stops receiving the first Bluetooth signal.

It can be understood that in the foregoing embodiment, it can be seen from S405 to S411 that before the first electronic device 100 is in the target state (for example, the first electronic device 100 is carried with a walking user), the first electronic device 100 can also obtain location information from the target module. The set of the location information obtained from the target module before the first electronic device 100 is in the target state can be part of the trajectory information of the first electronic device 100. The set of the location information obtained by the first electronic device 100 from the target module after the first electronic device 100 is in the target state (for example, the user walks onto the high-speed train) can be used as another part of the trajectory information of the first electronic device 100. To be specific, the trajectory information of the first electronic device 100 may include the location information obtained from the target module before the first electronic device 100 is in the target state and the location information obtained from the target module after the first electronic device 100 is in the target state.

Similarly, it still can be seen from S405 to S411 that before the first electronic device 100 is in the target state (for example, the first electronic device 100 is carried with a walking user), the first electronic device 100 can record the location information obtained from the target module at a time when the first Bluetooth signal broadcast by the first Bluetooth peripheral 300 is received, as part of the trajectory information of the first Bluetooth peripheral 300. After the first electronic device 100 is in the target state (for example, the user carrying the first electronic device 100 walks onto the high-speed train), the first electronic device 100 can record the location information obtained from the target module at a time when the first Bluetooth signal broadcast by the first Bluetooth peripheral 300 is received and the location information in the trajectory information of the first electronic device within the second duration, as another part of the trajectory information of the first Bluetooth peripheral 300. To be specific, the trajectory information of the first Bluetooth peripheral 300 includes part of the trajectory information of the first Bluetooth peripheral 300 recorded before the first electronic device 100 is in the target state and another part of the trajectory information of the first Bluetooth peripheral 300 recorded after the first electronic device 100 is in the target state.

It can be understood that based on a same principle as the foregoing S411, because the trajectory information of the first Bluetooth peripheral 300 includes part of the trajectory information of the first Bluetooth peripheral 300 after the first electronic device 100 is in the target state, and because the trajectory information of the first Bluetooth peripheral 300 includes part of the trajectory information of the first Bluetooth peripheral 300 after the first electronic device 100 is in the target state, supplementing missing location information of the first Bluetooth peripheral 300, content of the obtained entire trajectory information of the first Bluetooth peripheral 300 is then more abundant with higher reliability. In this case, an alert that the first Bluetooth peripheral 300 is tracked, given by the first electronic device 100 based on the trajectory information of the first electronic device 100 and the trajectory information of the first Bluetooth peripheral 300 is also very reliable.

In addition, the foregoing embodiment is described by using an example in which the location information in the trajectory information of the first electronic device 100 and the trajectory information of the first Bluetooth peripheral 300 is base station identifier(s). In some other embodiments, the location information in the trajectory information of the first electronic device 100 and the trajectory information of the first Bluetooth peripheral 300 may alternatively be, but is not limited to, GPS positioning information. In this way, a method for calculating the similarity between the trajectory information of the first electronic device 100 and the trajectory information of the first Bluetooth peripheral 300 may alternatively include:

calculating, by the first electronic device 100 based on GSP positioning information in the trajectory information of the first Bluetooth peripheral 300, a moving distance indicated by the trajectory information of the first Bluetooth peripheral 300; and calculating, by the first electronic device 100 based on GSP positioning information in the trajectory information of the first electronic device 100, a moving distance indicated by the trajectory information of the first electronic device 100; and calculating, by the first electronic device 100 based on an equation S=S1/S2, the similarity between the trajectory information of the first electronic device 100 and the updated trajectory information of the first Bluetooth peripheral 300, where S1 is the moving distance indicated by the trajectory information of the first Bluetooth peripheral 300, S2 is the moving distance indicated by the trajectory information of the first electronic device 100, and S is the similarity between the trajectory information of the first electronic device 100 and the updated trajectory information of the first Bluetooth peripheral 300.

In addition, the target state is described by using an example of a moving state of the first electronic device 100 being carried with a user on a high-speed train. In some other embodiments, the target state may alternatively be a moving state of the first electronic device 100 being carried with a user on a train, or a moving state of the first electronic device 100 being carried with a user on a vehicle driving on a highway, which is not limited herein.

In addition, in the device tracking detection method provided in the described embodiment of this application, the trigger operation mentioned may include a click operation, a long-press operation, a gesture trigger operation, and the like, which are not limited herein.

Figure 14:
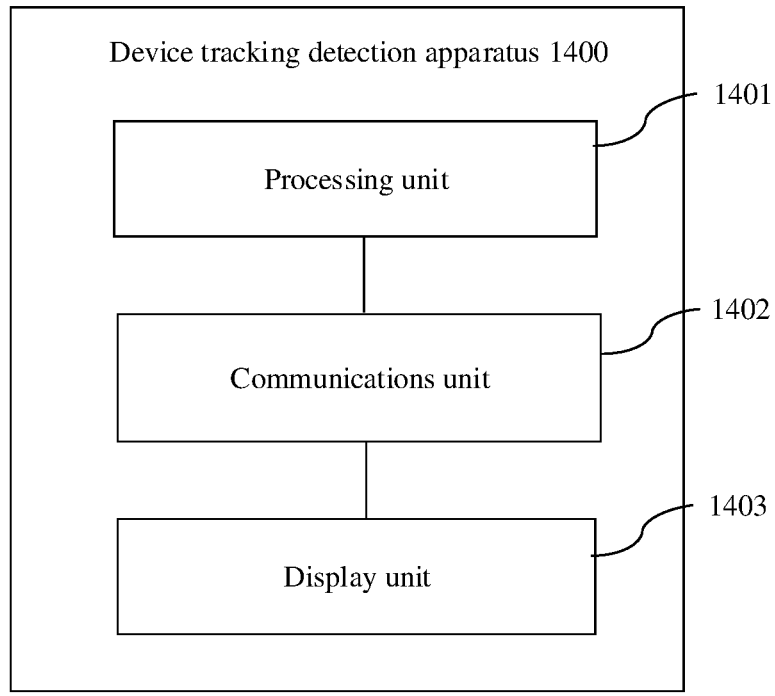
FIG. 14 is a schematic diagram of functional modules of a device tracking detection apparatus according to an embodiment of this application.

Referring to FIG. 14, this application provides a device tracking detection apparatus 1400, applied to a first electronic device, where the first electronic device includes a target module, and the target module is configured to cache location information of a location at which the first electronic device is located. The apparatus 1400 provided in this application includes a processing unit 1401 configured to obtain location information from the target module and record the obtained location information as location information of the first electronic device, where a set of the location information of the first electronic device is first trajectory information. The processing unit 1401 is further configured to obtain location information from the target module when a first Bluetooth signal is received based on a first signal filter. The processing unit 1401 is further configured to record the location information obtained at a time when the first Bluetooth signal is received, as location information of a first Bluetooth peripheral, where a set of the location information of the first Bluetooth peripheral is second trajectory information. The processing unit 1401 is further configured to determine whether the first electronic device is in a target state, where the target state is a state in which a moving speed is greater than a preset speed threshold. When the first electronic device is in the target state, the processing unit 1401 is further configured to obtain location information within a second duration from the first trajectory information, where the second duration is terminated at a time when the first electronic device receives the first Bluetooth signal, and the second duration is a period duration during which the first Bluetooth peripheral broadcasts the first Bluetooth signal. The processing unit 1401 is further configured to insert the location information obtained within the second duration into the second trajectory information to update the second trajectory information. The processing unit 1401 is further configured to alert, when similarity between the first trajectory information and the updated second trajectory information is greater than a preset similarity threshold, a user of being tracked by the first Bluetooth peripheral.

In a possible implementation, the processing unit 1401 is specifically configured to obtain location information from the target module and insert the location information obtained from the target module into a created first data table. In the first data table, there is a correspondence between a physical address of the first electronic device and the location information.

In a possible implementation, the processing unit 1401 is specifically configured to insert the location information obtained from the target module at a time when the first Bluetooth signal is received into a created second data table. In the second data table, there is a correspondence between a physical address of the first Bluetooth peripheral and the location information.

In a possible implementation, the processing unit 1401 is specifically configured for the first electronic device in the target state to determine whether content within the second duration in the second trajectory information is null; and when the content within the second duration is null, the first electronic device obtains location information within the second duration from the first trajectory information.

In a possible implementation, the processing unit 1401 is further configured to enable a preset mode.

Further, the device tracking apparatus 1400 further includes a display unit 1403 configured to display a first screen, where the first screen includes a first control. The processing unit 1401 is specifically configured to enable the preset mode in response to a trigger operation by the user on the first control.

Further, the display unit 1403 is specifically configured to display a system desktop in response to the trigger operation by the user, where the system desktop includes a first prompt box, and the first prompt box includes the first control. The processing unit 1401 is specifically configured to enable the preset mode in response to an enabling operation by the user on the first control.

Alternatively, further, the display unit 1403 is specifically configured to display a system desktop, where the system desktop includes a "settings" icon. The display unit 1403 is further configured to display the first screen in response to a trigger operation by the user on the "settings" icon, where the first screen includes the first control. The processing unit 1401 is specifically configured to enable the preset mode in response to an enabling operation by the user on the first control.

In a possible implementation, the display unit 1403 is further configured to pop up a first notification in a navigation bar of a second screen that is being displayed and display alert information in response to a pull-down operation by the user on the navigation bar.

Further, the alert information includes a second control. A communications unit 1402 is further configured to establish a Bluetooth connection with the first Bluetooth peripheral based on the physical address carried in the first Bluetooth signal in response to a trigger operation by the user on the second control. The processing unit 1401 is further configured to control the first Bluetooth peripheral to perform a function of alerting.

In a possible implementation, the processing unit 1401 is further configured to control a motor of the first electronic device to vibrate. Alternatively, the processing unit 1401 is further configured to control a speaker of the first electronic device to output an alert tone. Alternatively, the processing unit 1401 is further configured to control a light indicator of the first electronic device to blink. Alternatively, the communications unit 1402 is further configured to send a control command to a wearable device with which a communication connection has been established, to control the wearable device to vibrate or output an alert tone.

In a possible implementation, the processing unit 1401 is further configured to compare the first trajectory information and the updated second trajectory information to find the similarity.

Further, the location information is base station identifier (s), and the processing unit 1401 is specifically configured to compare, based on an equation $$S = \frac{N1}{N2},$$

the first trajectory information and the updated second trajectory information to find the similarity, where N1 is a quantity of base station identifiers in the updated second trajectory information, N2 is a quantity of base station identifiers in the first trajectory information, and S is the similarity.

Alternatively, further, the location information is GPS positioning information. The processing unit 1401 is specifically configured to calculate, based on an equation $$S = \frac{S1}{S2},$$

the similarity between the first trajectory information and the updated second trajectory information, where S1 is a moving distance indicated by the GPS positioning information in the second trajectory information, S2 is a moving distance indicated by the GPS positioning information in the updated first trajectory information, and S is the similarity.

In a possible implementation, the processing unit 1401 is specifically configured to: obtain target information, where the target information is information characterizing the moving speed of the first electronic device; and detect, based on the target information, whether the first electronic device is in the target state.

Further, the target state is a moving state in which the moving speed of the first electronic device is greater than a first speed threshold, and the target information is location information. The processing unit 1401 is specifically configured to identify whether the location information obtained from the target module carries a field indicating that a base station is located along a high-speed railway, and if yes, determine that the first electronic device is in the target state. Alternatively, the target information is moving speed. The processing unit 1401 is specifically configured to determine whether the moving speed is greater than a preset first speed threshold, and if yes, determine that the first electronic device is in the target state. Alternatively, the target information is itinerary information recorded in an application program. The processing unit 1401 is specifically configured to detect whether a target period in the itinerary information is reached, and if yes, determine that the first electronic device is in the target state, where the itinerary information is used to indicate that the user is in the target state during the target period.

In a possible implementation, the communications unit 1402 is further configured to receive, based on a second signal filter, a second Bluetooth signal broadcast by a second electronic device.

Figure 15:
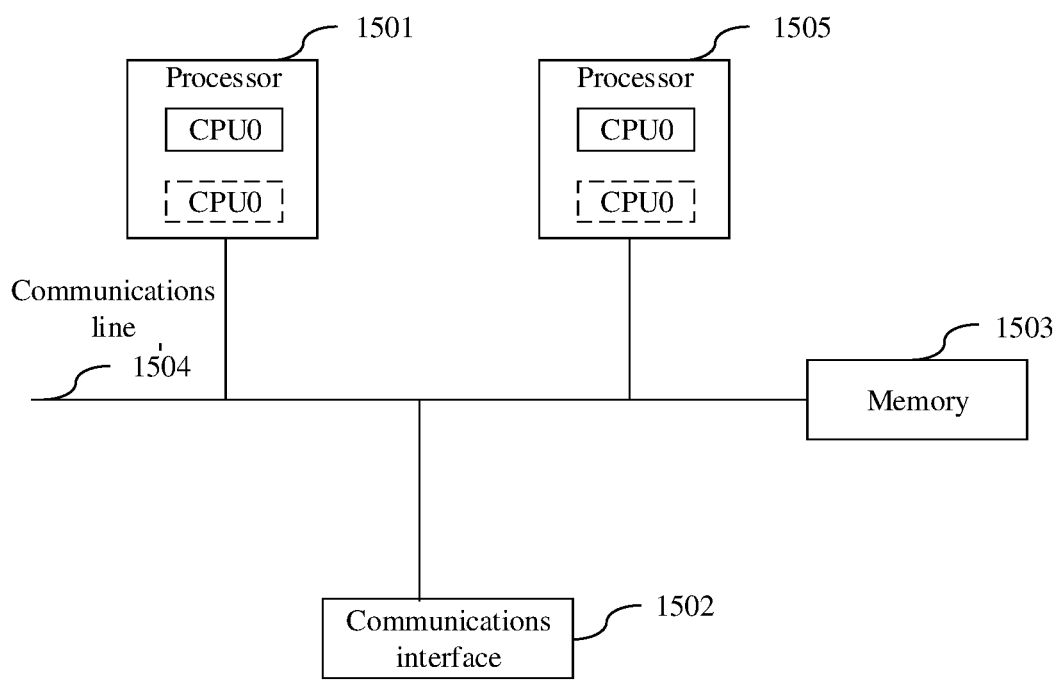
FIG. 15 is a schematic diagram of a hardware structure of an electronic device according to an embodiment of this application.

For example, FIG. 15 is a schematic diagram of a hardware structure of an electronic device according to an embodiment of this application. As shown in FIG. 15, the electronic device includes a processor 1501, a communications line 1504, and at least one communications interface (in FIG. 15, the communications interface 1502 is used as an example for description).

The processor 1501 may be a general-purpose central processing unit (central processing unit, CPU), a microprocessor, an application-specific integrated circuit (application-specific integrated circuit, ASIC), or one or more integrated circuits configured to control program execution of the solutions in this application.

The communications line 1504 may include a circuit for transmitting information between the foregoing components.

The communications interface 1502 is an apparatus using any transceiver or the like, and is configured to communicate with another device or a communications network, such as an Ethernet or a wireless local area network (wireless local area networks, WLAN).

Possibly, the electronic device may further include a memory 1503.

The memory 1503 may be a read-only memory (read-only memory, ROM) or another type of static storage device capable of storing static information and an instruction, a random access memory (random access memory, RAM) or another type of dynamic storage device capable of storing information and an instruction, an electrically erasable programmable read-only memory (electrically erasable programmable read-only memory, EEPROM), a compact disc read-only memory (compact disc read-only memory, CD-ROM) or another compact disc storage, an optical disc storage (including a compressed optical disc, a laser disc, an optical disc, a digital versatile disc, a blue-ray optical disc, and the like), a magnetic disk storage medium or another magnetic storage device, or any other medium capable of carrying or storing expected program code in a form of an instruction or a data structure and capable of being stored and accessed by a computer. However, the memory is not limited thereto. The memory may exist independently and is connected to the processor through the communications line 1504. Alternatively, the memory may be integrated with the processor.

The memory 1503 is configured to store computer-executable instructions for performing the solutions in this application, and execution of the computer-executable instructions is controlled by the processor 1501. The processor 1501 is configured to execute the computer-executable instructions stored in the memory 1503, to implement the device tracking detection method provided in the embodiments of this application.

Possibly, the computer-executable instructions in this embodiment of this application may also be referred to as application program code. This is not specifically limited in this embodiment of this application.

In a specific implementation, in an embodiment, the processor 1501 may include one or more CPUs, for example, a CPU 0 and a CPU 1 in FIG. 15.

In a specific implementation, in an embodiment, the electronic device may include a plurality of processors, such as the processor 1501 and a processor 1505 in FIG. 15. Each of the processors may be a single-core (single-CPU) processor, or may be a multi-core (multi-CPU) processor. The processor herein may be one or more devices, circuits, and/or processing cores configured to process data (for example, a computer program instruction).

Figure 16:
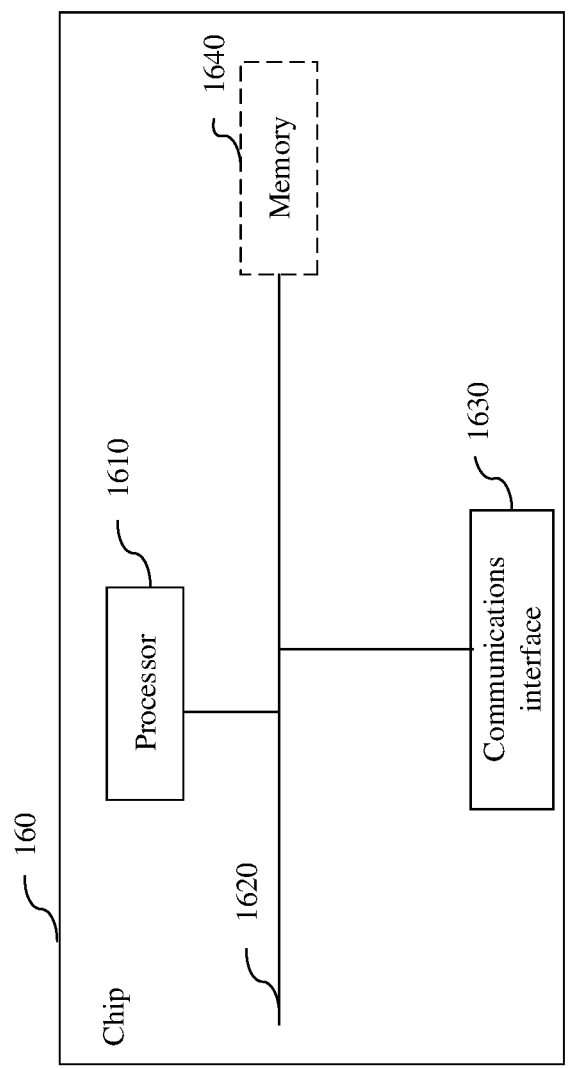
FIG. 16 is a schematic structural diagram of a chip according to an embodiment of this application.

For example, FIG. 16 is a schematic structural diagram of a chip according to an embodiment of this application. The chip 160 includes one or more than two (including two) processors 1610 and communications interfaces 1630.

In some implementations, a memory 1640 stores the following elements: an executable module or a data structure, or a subset thereof, or an extended set thereof.

In this embodiment of this application, the memory 1640 may include a read-only memory and a random access memory, and provides instructions and data to the processor 1610. A part of the memory 1640 may further include a non-volatile random access memory (non-volatile random access memory, NVRAM).

In this embodiment of this application, the memory 1640, the communications interface 1630, and the memory 1640 are coupled by using a bus system 1620. The bus system 1620 may further include a power bus, a control bus, a status signal bus, and the like, in addition to a data bus. For ease of description, various buses are marked as the bus system 1620 in FIG. 16.

The method described in the foregoing embodiments of this application may be applied to the processor 1610 or implemented by the processor 1610. The processor 1610 may be an integrated circuit chip with a signal processing capability. During implementation, the steps of the foregoing methods may be implemented by hardware integrated logic circuits in the processor 1610 or instructions in the form of software. The foregoing processor 1610 may be a general-purpose processor (for example, a microprocessor or a conventional processor), a digital signal processor (digital signal processing, DSP), an application-specific integrated circuit (application specific integrated circuit, ASIC), a field-programmable gate array (field-programmable gate array, FPGA) or another programmable logic device, a discrete gate, transistor logic device, or a discrete hardware component. The processor 1610 may implement or execute the methods, steps, and logical block diagrams disclosed in the embodiments of this application.

The steps of the methods disclosed with reference to the embodiments of this application may be directly implemented by a hardware decoding processor, or may be implemented by a combination of hardware and software modules in a decoding processor. The software module may be located in a storage medium mature in the art, such as a random access memory, a read-only memory, a programmable read-only memory, or an electrically erasable programmable read only memory (electrically erasable programmable read only memory, EEPROM). The storage medium is located in the memory 1640, and the processor 1610 fetches information in the memory 1640, and completes the steps of the foregoing method in combination with its hardware.

In the foregoing embodiment, the instruction stored by the memory and executed by the processor may be implemented in a form of a computer program product. The computer program product may be written into the memory in advance, or may be downloaded to and installed in the memory in a form of software.

The computer program product includes one or more computer instructions. When computer program instructions are loaded and executed on a computer, the processes or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. For example, the usable medium may include a magnetic medium (for example, a floppy disk, a hard disk, or a magnetic tape), an optical medium (for example, a digital versatile disc (digital versatile disc, DVD)), a semiconductor medium (for example, a solid state drive (solid state disk, SSD)), or the like.

An embodiment of this application further provides a computer-readable storage medium. The methods described in the foregoing embodiments may be all or partially implemented by using software, hardware, firmware, or any combination thereof. The computer-readable medium may include a computer storage medium and a communications medium, and may further include any medium that may enable a computer program to be transmitted from one place to another place. The storage medium may be any target medium accessible by a computer.

As a possible design, the computer-readable medium may include a compact disc read-only memory (compact disc read-only memory, CD-ROM), a RAM, a ROM, an EEPROM or another disc storage. The computer-readable medium may include magnetic disk storage or other magnetic disk storage devices. Any connecting line may also be properly termed a computer-readable medium. For example, if software is transmitted from a website, a server, or another remote source by using a coaxial cable, an optical cable, a twisted pair, a DSL, or a wireless technology (such as infrared, radio, or microwave), then the coaxial cable, the optical cable, the twisted pair, the DSL, or the wireless technology such as infrared, radio, or microwave is included in the definition of medium. Disk and disc, as used herein, include compact disc (CD), laser disc, optical disc, digital versatile disc (digital versatile disc, DVD), floppy disk, and Blu-ray disc, where disks usually reproduce data magnetically, while discs reproduce data optically with lasers.

Combination of the foregoing should also be included in the protection scope of the computer-readable medium. The foregoing descriptions are merely specific implementations of this application, but are not intended to limit the protection scope of this application. Any variations or replacements apparent to those skilled in the art within the technical scope disclosed by this application shall fall within the protection scope of this application. Therefore, the protection scope of this application shall be subject to the protection scope of the claims.

What is claimed is:

1. A device tracking detection method, applied to a first electronic device, wherein the first electronic device comprises a target module, and the target module is configured to cache location information of a location at which the first electronic device is located, and the method comprises:

obtaining, by the first electronic device, location information from the target module and recording the obtained location information as location information of the first electronic device, wherein a set of the location information of the first electronic device is first trajectory information;

obtaining, by the first electronic device, location information from the target module when a first Bluetooth signal is received based on a first signal filter;

recording, by the first electronic device, the location information obtained at a time when the first Bluetooth signal is received, as location information of a first Bluetooth peripheral, wherein a set of the location information of the first Bluetooth peripheral is second trajectory information;

determining, by the first electronic device, whether it is in a target state, wherein the target state is a state in which a moving speed is greater than a preset speed threshold;

obtaining, by the first electronic device when in the target state, location information within a second duration from the first trajectory information, wherein the second duration is terminated at a time when the first electronic device receives the first Bluetooth signal, and the second duration is a period duration during which the first Bluetooth peripheral broadcasts the first Bluetooth signal;

inserting, by the first electronic device, the location information obtained within the second duration into the second trajectory information to update the second trajectory information; and alerting, by the first electronic device when similarity between the first trajectory information and the updated second trajectory information is greater than a preset similarity threshold, a user of being tracked by the first Bluetooth peripheral.

2. The method according to claim 1, wherein the obtaining, by the first electronic device, location information from the target module and recording the obtained location information as location information of the first electronic device comprises:

obtaining, by the first electronic device, location information from the target module; and inserting, by the first electronic device, the location information obtained from the target module into a created first data table, wherein in the first data table, there is a correspondence between a physical address of the first electronic device and the location information.

3. The method according to claim 1, wherein the recording, by the first electronic device, the location information obtained at a time when the first Bluetooth signal is received, as location information of a first Bluetooth peripheral comprises:

inserting, by the first electronic device, the location information obtained from the target module at the time when the first Bluetooth signal is received into a created second data table, wherein in the second data table, there is a correspondence between a physical address of the first Bluetooth peripheral and the location information.

4. The method according to claim 1, wherein the obtaining, by the first electronic device when in the target state, location information within a second duration from the first trajectory information comprises:

determining, by the first electronic device when in the target state, whether the location information is recorded within the second duration in the first trajectory information; and when the location information is recorded, obtaining, by the first electronic device, location information within the second duration from the first trajectory information.

5. The method according to claim 1, wherein before the obtaining, by the first electronic device, location information from the target module and recording the obtained location information as location information of the first electronic device, the method further comprises:

enabling, by the first electronic device, a preset mode the enabling, by the first electronic device, a preset mode comprises:
  displaying, by the first electronic device, a first screen, wherein the first screen comprises a first control; and
  enabling, by the first electronic device, the preset mode in response to a trigger operation by the user on the first control.

6. The method according to claim 5, wherein the first screen is a system desktop, and the displaying, by the first electronic device, a first screen comprises:
  displaying, by the first electronic device, the system desktop in response to the trigger operation by the user, wherein the system desktop comprises a first prompt box, and the first prompt box comprises the first control; and
  enabling, by the first electronic device, the preset mode in response to an enabling operation by the user on the first control.

7. The method according to claim 5, wherein the displaying, by the first electronic device, a first screen comprises:
  displaying, by the first electronic device, a system desktop, wherein the system desktop comprises a "settings" icon;
  displaying, by the first electronic device, the first screen in response to a trigger operation by the user on the "settings" icon, wherein the first screen comprises the first control; and
  enabling, by the first electronic device, the preset mode in response to an enabling operation by the user on the first control.

8. The method according to claim 1, wherein the alerting, by the first electronic device, a user of being tracked by the first Bluetooth peripheral comprises:
  popping up, by the first electronic device, a first notification in a navigation bar of a second screen that is being displayed; and
  displaying, by the first electronic device, alert information in response to a pull-down operation by the user on the navigation bar.

9. The method according to claim 8, wherein the alert information comprises a second control, and after the displaying alert information, the method further comprises:
  establishing, by the first electronic device, a Bluetooth connection with the first Bluetooth peripheral based on a physical address carried in the first Bluetooth signal in response to a trigger operation by the user on the second control; and
  controlling, by the first electronic device, the first Bluetooth peripheral to perform a function of alerting.

10. The method according to claim 1, wherein the determining, by the first electronic device, whether it is in a target state comprises:
  obtaining, by the first electronic device, target information, wherein the target information is information characterizing the moving speed of the first electronic device; and
  detecting, by the first electronic device based on the target information, whether it is in the target state.

11. A first electronic device, comprising a memory, a processor, and a computer program stored in the memory and capable of running on the processor, the first electronic device comprises a target module, and the target module is configured to cache location information of a location at which the first electronic device is located, wherein when the computer program is executed by the processor, the first electronic device is caused to perform the following steps:
  obtaining, by the first electronic device, location information from the target module and recording the obtained location information as location information of the first electronic device, wherein a set of the location information of the first electronic device is first trajectory information;
  obtaining, by the first electronic device, location information from the target module when a first Bluetooth signal is received based on a first signal filter;
  recording, by the first electronic device, the location information obtained at a time when the first Bluetooth signal is received, as location information of a first Bluetooth peripheral, wherein a set of the location information of the first Bluetooth peripheral is second trajectory information;
  determining, by the first electronic device, whether it is in a target state, wherein the target state is a state in which a moving speed is greater than a preset speed threshold;
  obtaining, by the first electronic device when in the target state, location information within a second duration from the first trajectory information, wherein the second duration is terminated at a time when the first electronic device receives the first Bluetooth signal, and the second duration is a period duration during which the first Bluetooth peripheral broadcasts the first Bluetooth signal;
  inserting, by the first electronic device, the location information obtained within the second duration into the second trajectory information to update the second trajectory information; and
  alerting, by the first electronic device when similarity between the first trajectory information and the updated second trajectory information is greater than a preset similarity threshold, a user of being tracked by the first Bluetooth peripheral.

12. The electronic device according to claim 11, wherein the obtaining, by the first electronic device, location information from the target module and recording the obtained location information as location information of the first electronic device comprises:
  obtaining, by the first electronic device, location information from the target module; and
  inserting, by the first electronic device, the location information obtained from the target module into a created first data table, wherein in the first data table, there is a correspondence between a physical address of the first electronic device and the location information.

13. The electronic device according to claim 11, wherein the recording, by the first electronic device, the location information obtained at a time when the first Bluetooth signal is received, as location information of a first Bluetooth peripheral comprises:
  inserting, by the first electronic device, the location information obtained from the target module at the time when the first Bluetooth signal is received into a created second data table, wherein in the second data table, there is a correspondence between a physical address of the first Bluetooth peripheral and the location information.

14. The electronic device according to claim 11, wherein the obtaining, by the first electronic device when in the target state, location information within a second duration from the first trajectory information comprises:
  determining, by the first electronic device when in the target state, whether the location information is recorded within the second duration in the first trajectory information; and when the location information is recorded, obtaining, by the first electronic device, location information within the second duration from the first trajectory information.

15. The electronic device according to claim 11, wherein the electronic device is further caused to perform the following steps, before the obtaining, by the first electronic device, location information from the target module and recording the obtained location information as location information of the first electronic device:
enabling, by the first electronic device, a preset mode,
the enabling, by the first electronic device, a preset mode comprises:
displaying, by the first electronic device, a first screen, wherein the first screen comprises a first control; and
enabling, by the first electronic device, the preset mode in response to a trigger operation by the user on the first control.

16. The electronic device according to claim 15, wherein the first screen is a system desktop, and the displaying, by the first electronic device, a first screen comprises:
displaying, by the first electronic device, the system desktop in response to the trigger operation by the user, wherein the system desktop comprises a first prompt box, and the first prompt box comprises the first control; and
enabling, by the first electronic device, the preset mode in response to an enabling operation by the user on the first control.

17. The electronic device according to claim 16, wherein the displaying, by the first electronic device, a first screen comprises:
displaying, by the first electronic device, a system desktop, wherein the system desktop comprises a "settings" icon;
displaying, by the first electronic device, the first screen in response to a trigger operation by the user on the "settings" icon, wherein the first screen comprises the first control; and
enabling, by the first electronic device, the preset mode in response to an enabling operation by the user on the first control.

18. The electronic device according to claim 11, wherein the alerting, by the first electronic device, a user of being tracked by the first Bluetooth peripheral comprises:
popping up, by the first electronic device, a first notification in a navigation bar of a second screen that is being displayed; and
displaying, by the first electronic device, alert information in response to a pull-down operation by the user on the navigation bar.

19. The electronic device according to claim 18, wherein the alert information comprises a second control, and the electronic device is further caused to perform the following steps after the displaying alert information:
establishing, by the first electronic device, a Bluetooth connection with the first Bluetooth peripheral based on a physical address carried in the first Bluetooth signal in response to a trigger operation by the user on the second control; and
controlling, by the first electronic device, the first Bluetooth peripheral to perform a function of alerting.

20. The method according to claim 11, wherein the determining, by the first electronic device, whether it is in a target state comprises:
obtaining, by the first electronic device, target information, wherein the target information is information characterizing the moving speed of the first electronic device; and
detecting, by the first electronic device based on the target information, whether it is in the target state.

\* \* \* \* \*

UNITED STATES PATENT AND TRADEMARK OFFICE
CERTIFICATE OF CORRECTION

| | | |
|---|---|---|
| PATENT NO. | : 12,328,643 B2 | Page 1 of 1 |
| APPLICATION NO. | : 17/925402 | |
| DATED | : June 10, 2025 | |
| INVENTOR(S) | : Nengfu Tang | |

It is certified that error appears in the above-identified patent and that said Letters Patent is hereby corrected as shown below:

On the Title Page

Change "(71) Applicant: HONOR DEVICE CO., LTD., Guangdong (CN)" to "(71) Applicant: HONOR DEVICE CO., LTD., Shenzhen (CN)".

Signed and Sealed this
Fifteenth Day of July, 2025

Coke Morgan Stewart
*Acting Director of the United States Patent and Trademark Office*